Aug. 15, 1950     E. R. BURTNETT     2,519,022
POWER TRANSMITTING MECHANISM

Filed April 10, 1944     7 Sheets-Sheet 1

Inventor:
Everett R. Burtnett
By Williams, Bradbury & Hinkle
Attorneys.

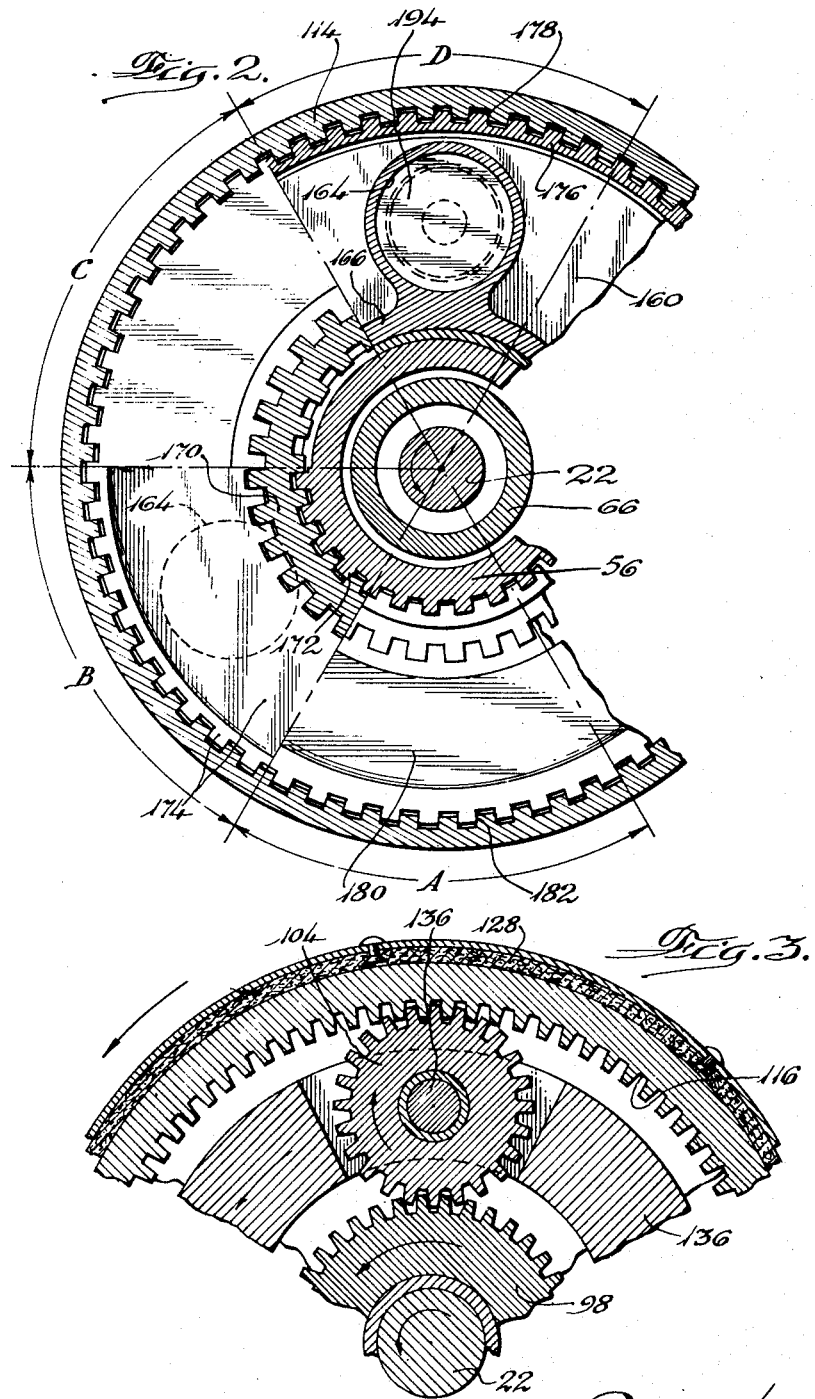

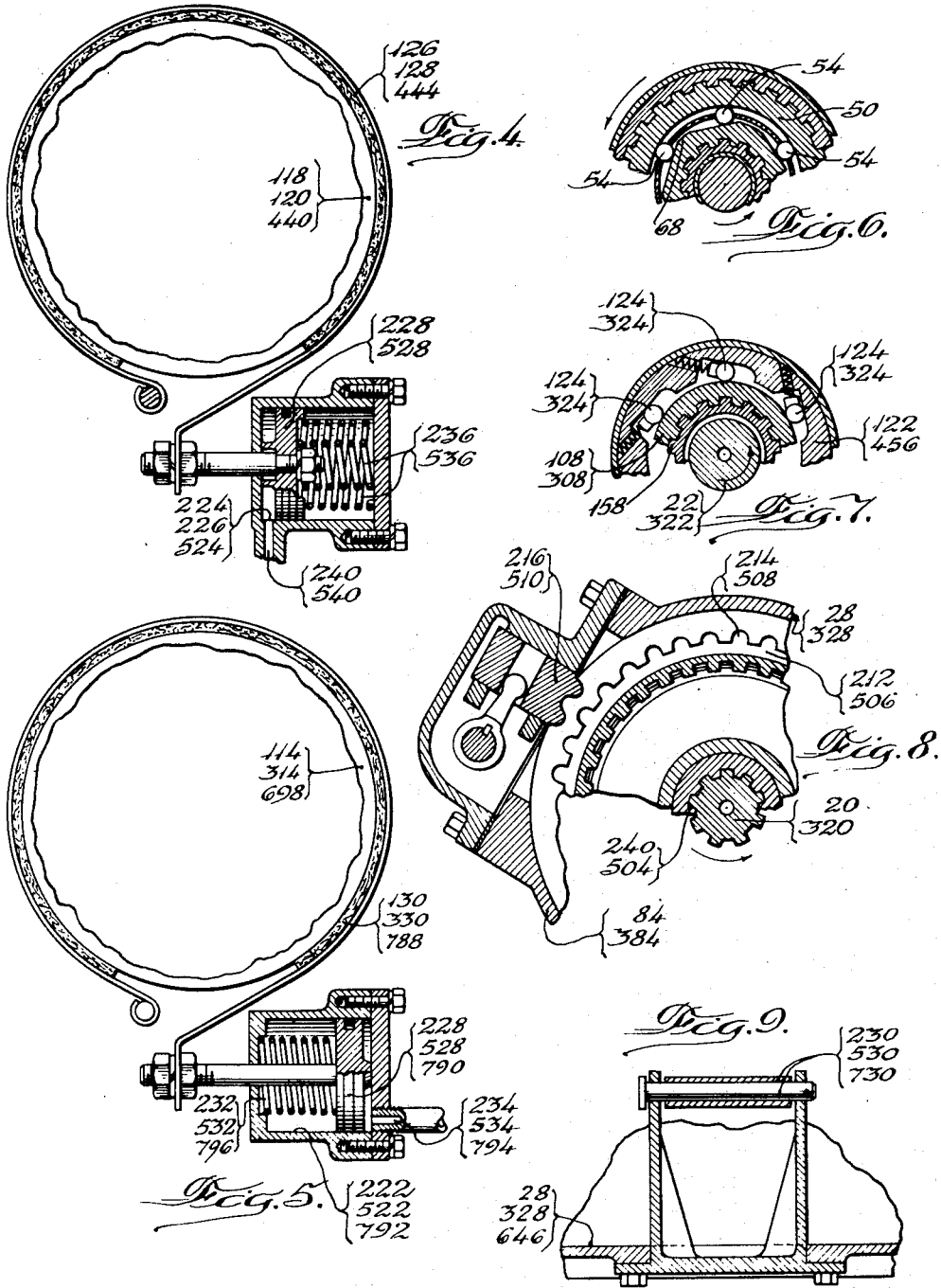

Aug. 15, 1950  E. R. BURTNETT  2,519,022
POWER TRANSMITTING MECHANISM
Filed April 10, 1944  7 Sheets-Sheet 4
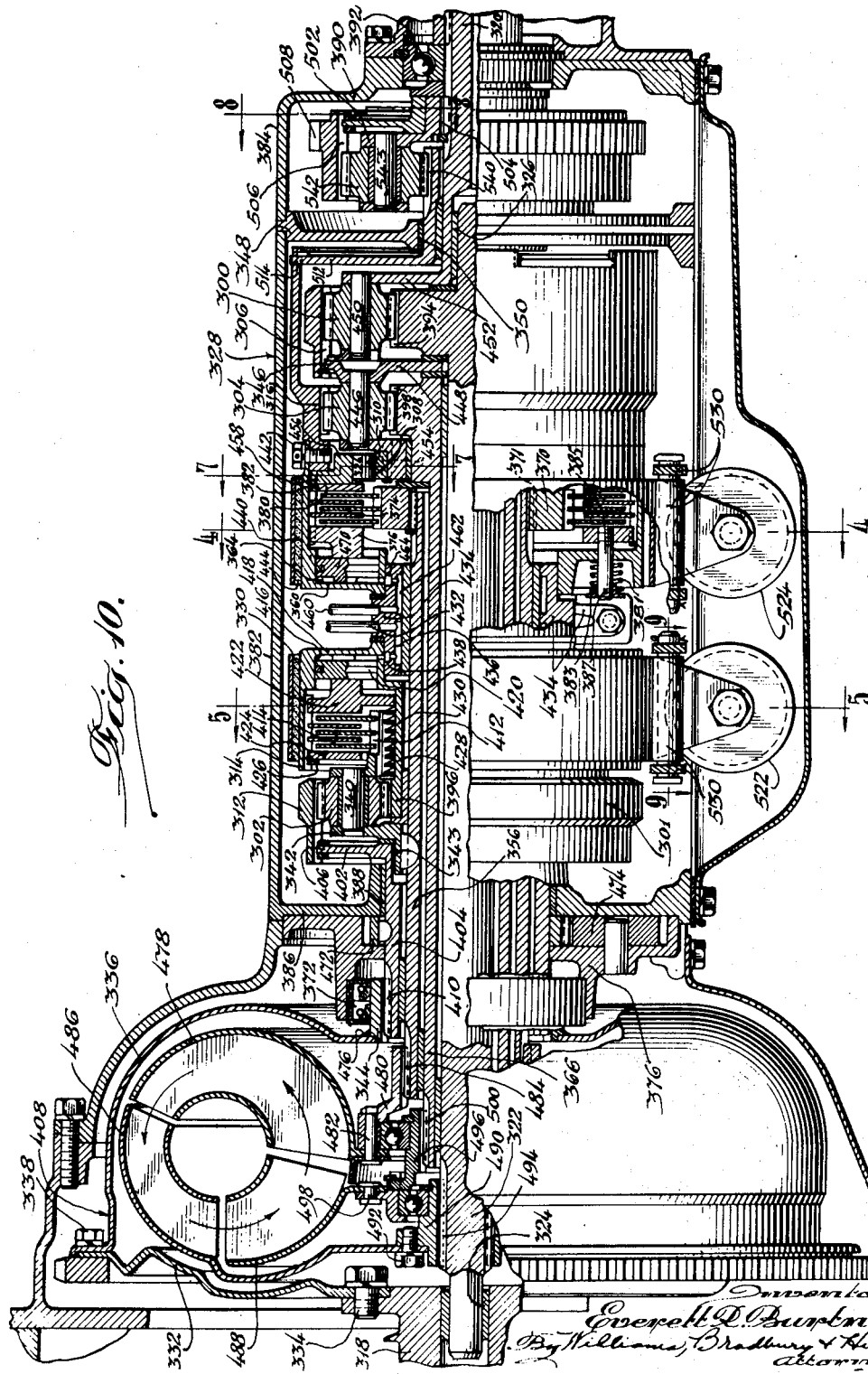

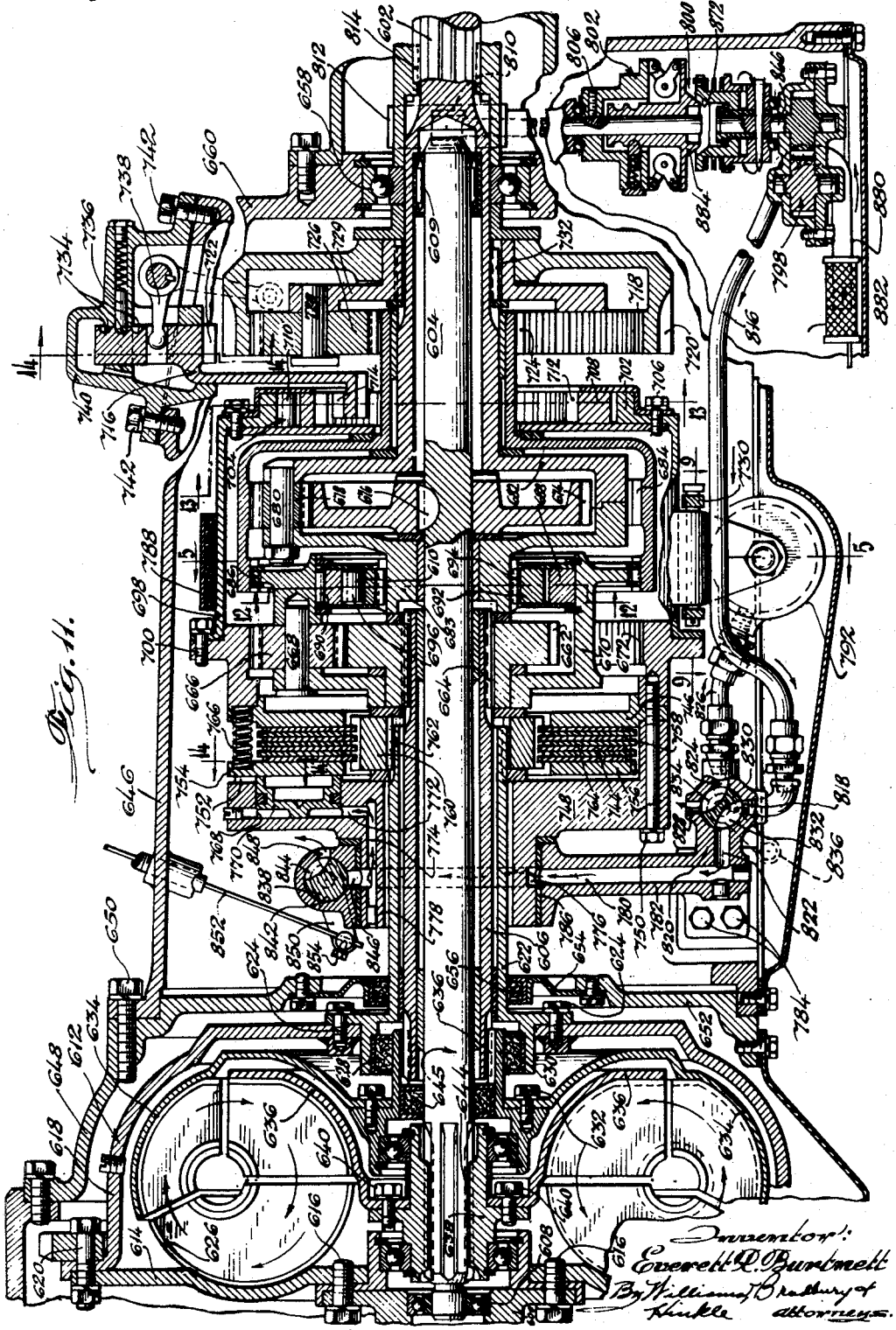

Aug. 15, 1950 E. R. BURTNETT 2,519,022
POWER TRANSMITTING MECHANISM
Filed April 10, 1944 7 Sheets-Sheet 6
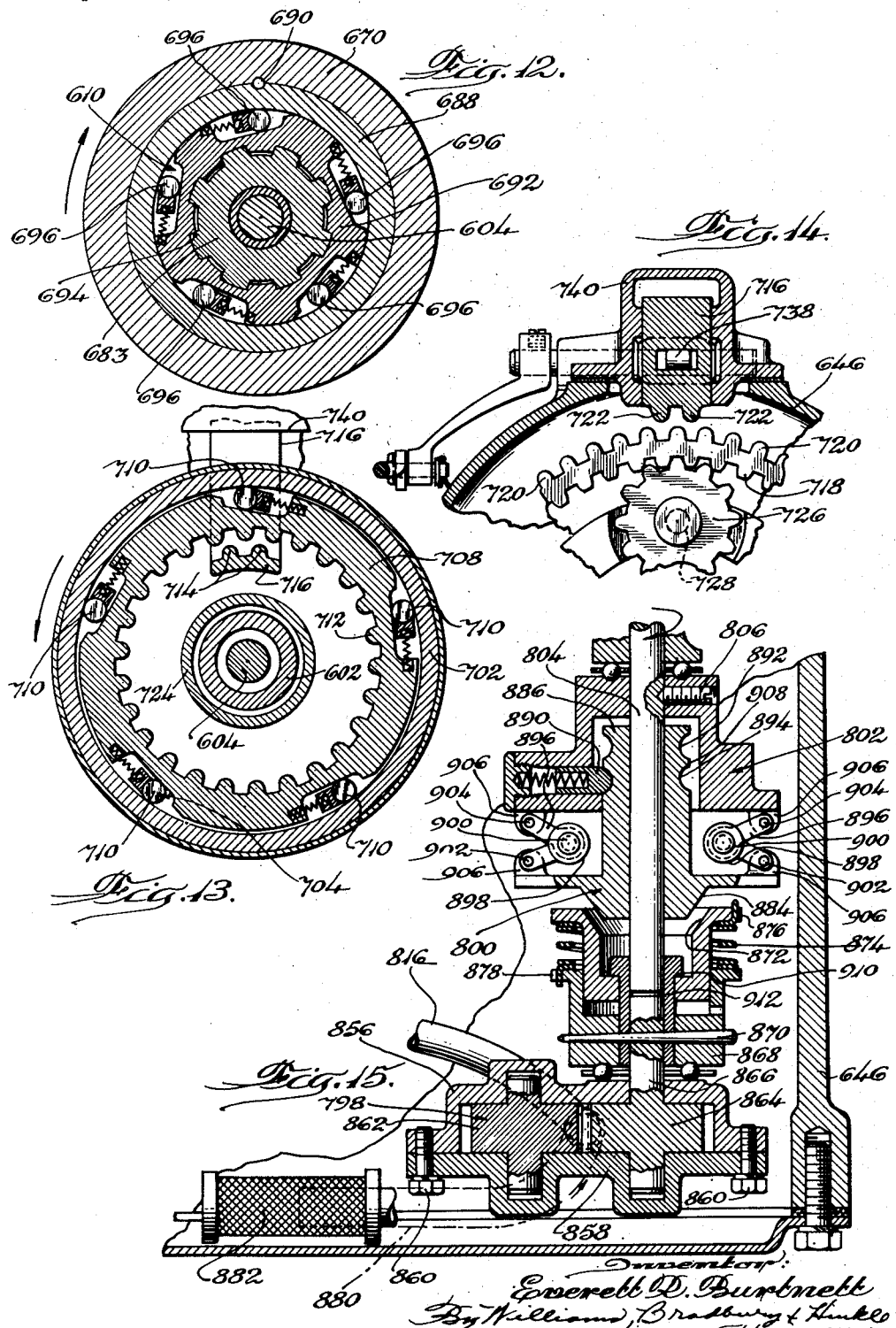

Aug. 15, 1950  E. R. BURTNETT  2,519,022
POWER TRANSMITTING MECHANISM
Filed April 10, 1944  7 Sheets-Sheet 7

Inventor:
Everett R. Burtnett
By Williams, Bradbury & Hinkle
Attorneys

Patented Aug. 15, 1950

2,519,022

UNITED STATES PATENT OFFICE 2,519,022

POWER TRANSMITTING MECHANISM

Everett R. Burtnett, Chicago, Ill., assignor, by direct and mesne assignments, to Borg-Warner Corporation, Chicago, Ill., a corporation of Illinois Application April 10, 1944, Serial No. 530,309

26 Claims. (Cl. 74—688)

My invention relates to power transmitting mechanism and more particularly to a variable speed transmission especially adapted for automobiles and similar vehicles but capable of other uses.

The provision of a transmission of the character briefly outlined above being the principal object of the invention, another object of the invention is to provide a fluid coupling and epicyclic gearing drive mechanism with which the infinitely variable rate multiplying the torque performance of a hydraulic torque converter is secured in a differential gear unit under control of a fluid coupling unit, with advantages in that maximum rate multiplication of the torque of any ratio of torque throttle is secured in the gear for starting the load from standstill, and with the further advantage of the lower cost and more easily manufactured straight vane turbine wheel structure as compared with the forms of vanes necessary to provide a fluid torque converter.

Another object of the invention is to provide a fluid coupling and epicyclic gearing drive mechanism in which the epicyclic gearing is constituted and arranged so as to infinitely vary the rate of multiplication of the torque input thereto for driving an output shaft as a segmental second driven runner of a turbine wheel assembly, and providing for a single circuit of the working fluid circulated by one pump turbine wheel segment, gradually receiving an increasing portion of the torque hydraulically delivered to the primary driven runner segment from the pump wheel by virtue of the fluid discharged from the primary driven runner impinging the vanes or blades of the second driven segmental runner, with advantages in simplicity and in efficient fully automatic hydraulic control over infinitely variable driving speed and rate multiplication of the torque in a gear unit.

Another object of the invention is to provide a fluid turbine and epicyclic gearing drive mechanism in which series-parallel division of the input torque by an hydraulic drive coupling effect of the turbine unit and divided torque recombining effect in the epicyclic gearing combine to secure infinitely variable rate multiplication of the torque in the epicyclic gearing driving an output shaft, between two gear ratios.

Another object of the invention is to provide a fluid turbine and epicyclic gearing drive mechanism in which a second working fluid circuit of a turbine wheel assembly arranged in series-parallel coupling with a first working fluid circuit of another turbine wheel assembly is adapted to series-parallel divide the torque of a common input torque driving member, and for the epicyclic gearing to infinitely vary the rate multiplying the torque in response to the variations with respect to the ratio of the input torque delivered by the second working fluid circuit and while the epicyclic gearing effects recombination of the torque divided between the series-parallel first and second working fluid circuits before delivery to an output shaft, with advantages in higher efficiencies of fluid turbines controlling variable speed and torque ratio in gearing adapted to propel the load.

In carrying out the principles of the invention, briefly, the same contemplates the provision of a transmission including three inter-dependent planetary gear sets, each including a sun gear, a ring gear, planet gears, and a planet carrier for the latter. The sun gear of two of the planetary gear sets is capable of being connected to the driving shaft associated with the transmission by fluid coupling means and the third sun gear is directly connected to the driving shaft. A fourth planetary gear set is employed in the transmission and is provided for the purpose of obtaining reverse drive. Means are provided whereby the sun gears of each planetary gear set may selectively be braked to cause the same to become a reaction member of its respective transmission, and one of the planetary gear sets has associated therewith a clutch which may be employed to lock all of the elements of the gear set together to establish a direct drive. By selective energization of the various braking means and of the clutching means, a multiple number of forward speed drives and a reverse drive may be obtained. By virtue of the fluid coupling associated with two of the planetary gear sets, an infinitely variable speed ratio may be obtained between low and second speed gear ratios. Also by this arrangement, definite step ratio speed changes may take place between second and third gear ratios and between third and fourth gear ratios.

Another object of my invention is to provide a new and improved transmission in which a range of speed ratios is substituted for the usual fixed speed ratio.

Another object of my invention is to provide a new and improved multiple speed transmission in which there is infinite variation of torque multiplication in the lower speeds.

Another object of my invention is to provide a new and improved transmission having three forward speeds and a reverse speed.

Another object of my invention is to provide a new and improved transmission having four forward speeds and a reverse speed.

Another object of my invention is to provide a new and improved variable speed transmission having five forward speeds and a reverse speed.

Another object of my invention is to provide a new and improved transmission which can be operated to provide either a sequence of four forward speeds or a sequence of five forward speeds.

Another object of my invention is to provide a transmission having a new and improved arrangement of epicyclic gear trains and fluid coupling.

Another object of my invention is to provide a transmission having a new and improved arrangement of epicyclic gear trains and fluid couplings.

Another object of my invention is to provide a transmission having a new and improved arrangement of a multiple runner fluid coupling, torque multiplying gear trains driven thereby, and clutch and brake controls therefor.

Another object of my invention is to provide a new and improved transmission having a novel arrangement of torque multiplying gear trains, fluid couplings and one way clutches.

Another object of my invention is to provide a new and improved transmission having a novel automatic drive for a fluid pressure control mechanism.

Another object of my invention is to provide a new and improved transmission having a plurality of paths and sub-paths for the simultaneous and parallel flow of torque between an input shaft and an output or load shaft.

Another object of my invention is to provide a drive transmitting mechanism having new and improved sub-assemblies of epicyclic gear trains.

Another object of my invention is to provide a drive transmitting mechanism having a plurality of interrelated epicyclic gear trains and having novel mechanism for changing from a forward speed to reverse speed.

Another object of my invention is to provide a new and improved speed responsive drive for a fluid pump.

Other objects and advantages will become apparent as the description proceeds.

In the drawings:

Fig. 1 is a vertical sectional view through a preferred embodiment of my invention. This embodiment provides a sequence of four forward speeds and reverse.

Fig. 2 is an enlarged transverse sectional view of the embodiment of Fig. 1. Fig. 2 is divided into four parts, designated A, B, C and D. These parts of Fig. 2 are taken in the planes of the lines 2A, 2B, 2C and 2D, respectively, on Fig. 1.

Fig. 3 is an enlarged fragmentary transverse sectional view taken on the line 3—3 of Fig. 1. This view illustrates an epicyclic gear train and the application thereto of a brake band for preventing rotation of the ring gear of the epicyclic train. This band is normally held in engagement by a spring and is released by fluid pressure.

Fig. 4 is a fragmentary sectional view taken on the lines 4—4 of Figs. 1 and 10 and illustrates the application of a brake band to the ring gear of an epicyclic train, wherein the band is normally held in engaging position by spring means and is released by fluid pressure.

Fig. 5 is a fragmentary sectional view taken on the lines 5—5 of Figs. 1, 10 and 11 and illustrates an arrangement for applying a brake band to the internal gear of an epicyclic train through fluid pressure, wherein resilient means normally holds the brake band in released position.

Fig. 6 is a fragmentary sectional view taken on the line 6—6 of Fig. 1 and shows the one way clutch through which the impeller and input shaft attached thereto may be positively driven from one of the transmission shafts.

Fig. 7 is a fragmentary sectional view taken on the line 7—7 of Fig. 2 and 7—7 of Fig. 10 and shows another form of one way clutch used in a different part of the transmission.

Fig. 8 is a fragmentary sectional view taken on the lines 8—8 of Fig. 1 and Fig. 10 and shows a pawl for engaging the internal gear of the reverse epicyclic gear train.

Fig. 9 is a fragmentary horizontal sectional view taken on the lines 9—9 of Figs. 1, 10 and 11, showing the manner in which the fixed ends of the brake bands are pivotally anchored.

Fig. 10 is a vertical sectional view through another embodiment of my invention adapted to provide an optional sequence of either four or five forward speeds and reverse.

Fig. 11 is a vertical sectional view through a still further embodiment of my invention adapted to provide a sequence of three forward speeds and reverse.

Fig. 12 is a transverse sectional view taken on the line 12—12 of Fig. 11 and showing a novel arrangement of one way clutch directly connecting the output member of the slow speed ratio epicyclic gear train to the output member of a higher speed ratio epicyclic gear train.

Fig. 13 is a transverse sectional view taken on the line 13—13 of Fig. 11 and shows a one way clutch between a brake drum attached to the internal gear of an epicyclic gear train and a pawl engaging reaction annulus. In this figure the selector pawl which engages the reaction annulus is shown partly in section and partly in elevation.

Fig. 14 is a fragmentary sectional view taken on the line 14—14 of Fig. 11 and shows the forward, neutral and reverse drive selector pawl and associated mechanism.

Fig. 15 is an enlarged fragmentary sectional view through the fluid pump and speed responsive automatic clutch through which this pump is driven.

Figure 1:
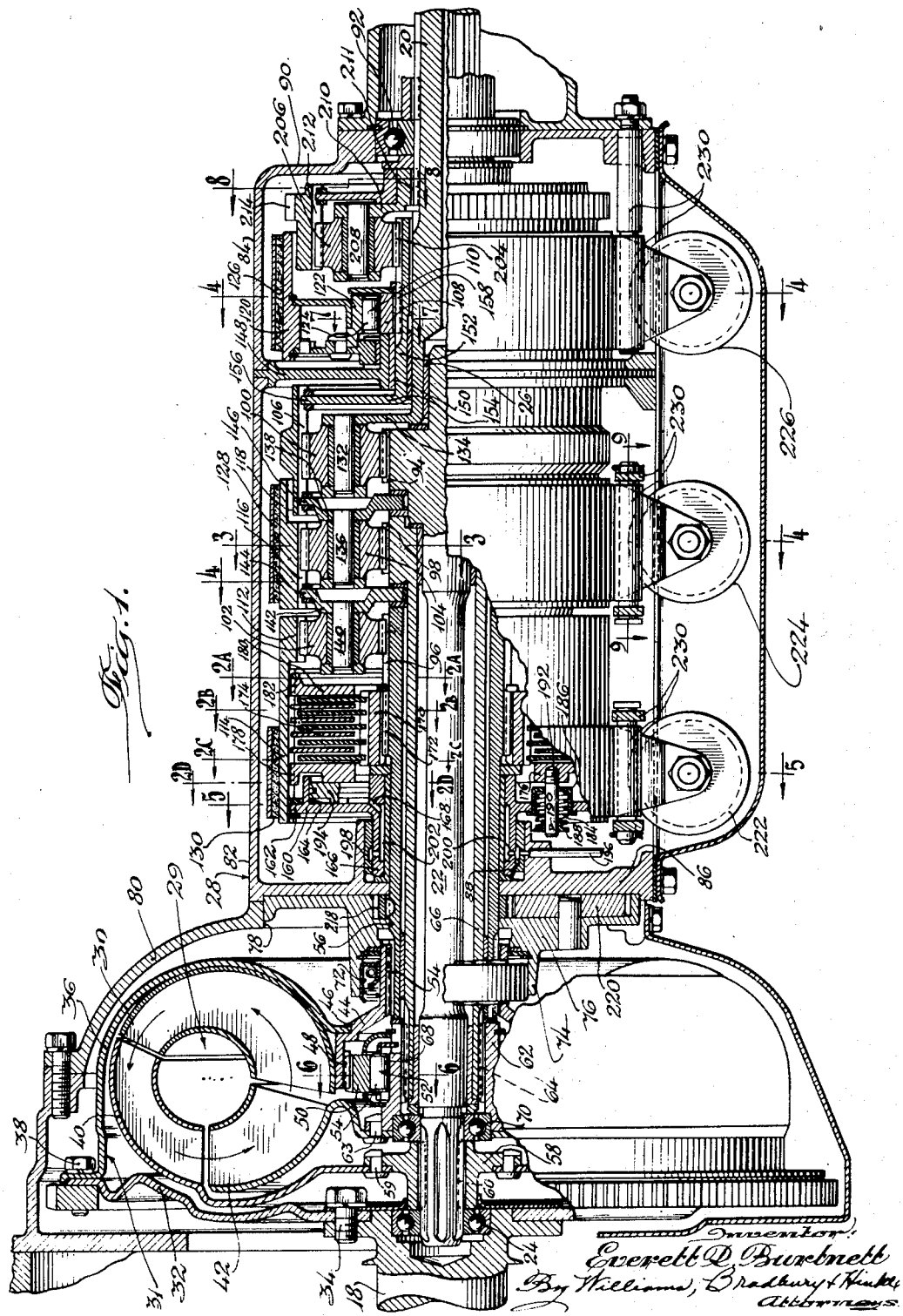

Referring now to Fig. 1, the drive shaft 18 is the primary input member and can be connected with a suitable source of power, such as an engine (not shown). The load or driven shaft 20 is the output member and can be connected with a device to be driven, such as road wheels of a motor vehicle (not shown). An innermost or first sun pinion driving shaft 22, forming one of a plurality of concentric intermediate shafts, is arranged between and in axial alignment with the input shaft 18 and the output shaft 20 and projects into the inner race of a ball bearing 24, the outer race of which in turn is mounted in a complementally recessed portion of the input shaft 18. Similarly, the rear end of the shaft 22 projects into a complementally recessed portion of the output shaft 20 and is carried by a plain bearing bushing 26 mounted therein.

Reverse drive and alternately a sequence of four forward speed drives are obtained through a fluid turbine drive coupling system and a plurality of epicyclic gear trains. The latter have relatively independently rotatable primary driving gear elements, as well as relatively rotatable secondary driving gear elements. These gear trains are compounded for torque multiplying gear function in such a manner that the total torque is divided between a plurality of epicyclic gear trains and recombined before delivery to the output shaft 20. The assembly for accomplishing this is supported in a casing 28.

Figure 16:
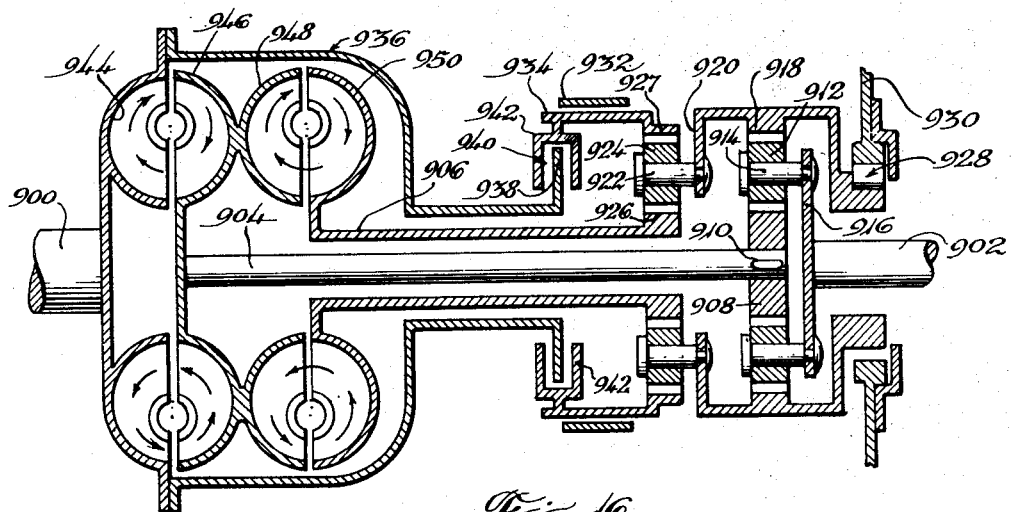
Fig. 16 is a diagrammatic vertical sectional view of another embodiment of my invention.
Figure 17:
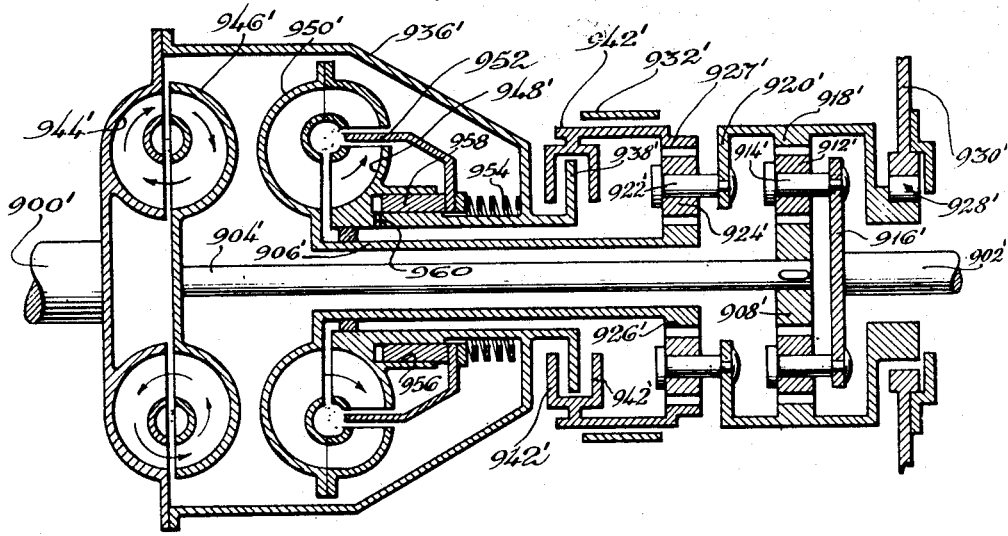
Fig. 17 is a diagrammatic sectional view through a modified form of the invention shown in Fig. 16 and wherein an additional control is provided.

The fluid coupling system can be either a plurality of impellers and runners arranged to yield a plurality of full hydraulic circuits as shown in Figs. 16 and 17 or a single hydraulic circuit in combination with a segmental runner construction as shown in Figs. 1, 10 and 11. In either form the parts are arranged to provide a first effectual fluid drive couple adapted for individually driving a low-speed, high rate, torque multiplying portion of the compounded epicyclic gear trains, and, sequentially and accumulatively, a second fluid drive couple adapted for individually and supplementively driving an additional portion of the plurality of compounded epicyclic gear trains thereby to establish higher-speed, lower rate multiplying the torque gear drive ratio for rotating the output shaft 20.

Accordingly, in Fig. 1 the fluid turbine coupling system 29 consists of an impeller member 30 for circulating a fluid in the fluid coupling and fixed to the input shaft 18 through the medium of a fly-wheel shell assembly 31 housing the fluid coupling system and comprising a disk 32 secured to the input shaft 18 by bolts 34 and a cover portion 36 secured to the disk 32 by bolts 38. The cover portion in turn carries the impeller member 30 rotatable therewith and in a sealed relation so as to prevent leakage of the fluid from within the fly-wheel assembly. The fluid coupling further includes relatively rotatable primary and secondary runners 40 and 42, respectively, adapted to be driven by the circulated fluid, the primary runner representing a first portion of the full lever arm value of the hydraulic circuit, while the secondary runner represents a second portion of the full lever arm value of the hydraulic circuit. The secondary runner is so disposed as to receive the fluid discharged from the primary runner and to discharge the fluid therefrom for return to the impeller.

The structure comprising impeller 30 and cover 36 has a hub portion 44 welded thereto as indicated at 46 and this hub is internally splined at 48 to mesh with an externally splined annulus 50 of a one-way clutch 52 the roller clutch members 54 of which engage the annulus 50. The hub 44 is also internally splined at 54 to receive a correspondingly, externally splined end of the outer tubular shaft 56 which is thus connected as an extension of the primary input shaft 18. A hub 58 is fixed to the primary runner 40 by rivets 59 and is internally splined at 60 to receive a correspondingly externally splined end of the innermost shaft 22 of the assembly of concentric intermediate shafts.

A hub 62 is fixed to the secondary runner 42 by rivets 63 and is internally splined at 64 to receive an externally splined end of a second intermediate shaft 66 which extends through the tubular shaft 56. The shaft 66 is rotatable independently of the shafts 56 and 22 between which it is located. Cam lobes 68 (Fig. 6) are formed on the hub 62 and operate when this hub is rotated in one direction to wedge the clutch roller members 54 into clutch holding engagement in the annulus 50. This constitutes a one-way clutch for locking the secondary runner and the tubular intermediate shaft assembly 42—46 to rotate the impeller and input shaft assembly 30—18 whenever the shaft 66 tends to rotate faster in a forward speed drive direction than the impeller 30 and the primary input shaft 18.

A bearing 70 will operate to transmit to hub 58 of the primary runner any leftward end thrust of the secondary runner, and the pilot bearing 24 in turn will operate to transmit that end thrust, plus any additional leftward end thrust of the primary runner 40 to the primary input shaft 18. Leftward end thrust of the fluid on runners 40 and 42 is balanced by rightward end thrust on impeller 30 which is connected to input shaft 18 through assembly 31, whereby opposing end thrusts cancel each other.

An oil seal unit 72 has a sealing element which flexibly engages a periphery on the hub 44. This seal is mounted in a recessed portion of a hub 74 of an end wall 76 secured in any suitable manner in a cylindrical portion 78 of a bell housing 80 which in turn is detachably secured to the casing 28. The seal 72 operates to prevent leakage of fluid along the shaft 56. The casing 28 is constructed in two end parts 82 and 84, the front part including an integral end wall portion 86 mounting a combined fluid pressure transfer and plain bearing arrangement 88 and the rear part including an integral end wall portion 90 mounting a rear main bearing 92 within which the output, driven, or load shaft 20 is journaled.

Third forward speed drive is obtained through a trio of compounded epicyclic or planetary gear trains each having an independently rotatable sun gear. Shaft 22 has the integral form of a first sun gear or rotatable element 94 as the primary driving gear element for the rear gear train, shaft 56 has the integral form of a second sun gear or rotatable element 96 as the primary driving gear element of the forward gear train, and shaft 66 has the integral form of a third sun gear or rotatable element 98 as the primary driving gear element of the intermediately positioned one of this trio of gear trains. Planet pinions 100 of the rear gear train mesh with sun gear 94, planet pinions 102 of the forward gear train mesh with the sun gear 96, and planet pinions 104 of the intermediate gear train mesh with the sun gear 98. Internal gear 103 is fixed to the concentric inner race 108 of a one-way clutch unit 110 (Fig. 7) and meshes with the planet pinions 100, ring gear or rotatable element 112 meshes with the planet pinions 102 and has a forwardly extending drum portion 114, and ring gear or rotatable element 116 meshes with planet pinions 104 and of itself forms a drum surface 118.

A drum 120 is fixed to the internally cammed annulus 122 of the one-way clutch 110, and clutch roller members 124 of the latter are adapted, by an engaging tendency on the part of the inner race 108 concentric therewith, to rotate in one direction corresponding with a tendency on the part of the ring gear 106 to rotate backwards, i. e., retrograde with respect to forward speed rotation on the part of sun gear 94, to wedgingly engage the internal cam in the annulus 122. Rotation of the drum 120 is controlled by a contractible brake band 126, which through the medium of the one-way clutch 110 will in turn prevent rotation of the ring gear 106 backwards. Rotation of ring gear 116 and integral drum 118 is controlled by brake band 128, and rotation of ring gear 112 and integral drum 114 is controlled by brake band 130.

The pinions 100 are mounted to rotate on pins 132 supported on a carrier 134, which can be a flanged forward end of the output shaft 20, while pinions 104 are mounted to rotate on pins 136 supported by a carrier 138, and pinions 102 are mounted to rotate on pins 140 supported by a carrier 142. The gear trains are compounded by fixing the carrier 142 to ring gear 116 through means of a splined connection 144, and by fixing the carrier 138 to ring gear 106 through means of a splined connection 146. A central wall 148 is fitted between the two parts 82 and 84 of the casing 28 and supports a plain bearing 150 within which a sleeve-shaped hub portion 152, of a flange 154, is journaled, while the flange portion 154 is fixed to the ring gear 106 through means of a splined connection 156, and the sleeve portion 152 is fixed to the inner race 108 of the one-way clutch 110 through a splined connection 158.

The one-way connection effected by the clutch unit 110 serves to complete the reaction connections for the ring gear 106 when the brake band 126 is applied, while at the same time this clutch permits the ring gear 106 to overrun in a forward speed direction, eliminating the necessity to release the brake band 126 to facilitate the ring gear 106 being rotated by drive established through either the intermediate gear train or a combination of the intermediate and the forward gear trains, respectively, for second and third speeds. The brake band 126 can be actuated to release to render the rear gear train no-drive for establishing the drive system in neutral.

The drum 114 serves as a housing for a clutch to connect two of the rotatable elements together and such housing includes the internally splined drum 114 and an end plate 160 fixed to the drum 114 through a splined connection 162, including a series of cylinders 164 bored therein and having a hub portion 166 journaled in the bearing 88 and drilled at 168 to communicate fluid pressure to the different cylinders 164. A peripherally splined hub 170 is fixed to the tubular shaft 56, forming an extension of the input shaft 18 through a splined connection 172. Clutch plates 174 alternately engage the internal splines in the drum 114 and the external splines on the hub 170. A pressure or engaging clutch plate 176 is axially slidable relative to but rotatable with the drum 114 through a splined connection 178. A bottom pressure clutch plate 180 is fixed to the drum 114 through a splined connection 182. Retractor springs 184, each contained in a cup 186, which are mounted in the end plate 160, are compressed between a washer 188, which is secured by a pin 190 to the end of a bolt 192, which in turn is threaded into an aperture provided therefor in the presser plate 176, and the end plate 160, thusly providing that the springs 184 will urge the pressure clutch plate 176 forwardly so that this clutch is normally actuated into a disengaged condition. Pistons 194 are fitted within the cylinders 164 and respectively abut the presser plate 176, so that upon the induction of fluid pressure between the heads of the cylinders and the pistons the latter will be actuated to the right and thus overrule the influence of the springs 184 and actuate the presser plate 176 to the right accomplishing actuation of this clutch into an engaged condition.

When the clutch plates 174 are engaged they will transmit a portion of the torque of the input shaft 18 in circumvention of the fluid coupling system directly to the ring gear or rotatable element 112, while a second portion of the torque of the input shaft 18 will be delivered also in circumvention of the fluid coupling system directly to the sun gear or rotatable element 96, and while a third portion of the torque of the input shaft 18 will be delivered through the primary fluid drive couple effectual between the impeller 30 and the primary runner 40, and while a subdivided portion of the third portion of the input torque will be delivered through the secondary fluid drive couple effectual between the primary runner 40 and the secondary runner 42 and thence through shaft 66 to sun gear or rotatable element 98, leaving the other sub-divided portion of the third portion of the torque of shaft 18 for delivery through shaft 22 to sun gear or rotatable element 94.

Fluid under pressure can pass through conduit 196 in the casing to an annular passage 198, thence through radial passages 200, reach first an annular space 202, and thence through the drilled holes 168 reach the cylinders 164 for actuating pistons 194 to press the presser plate 176 in clutch engaging direction.

Reverse drive is obtained through a fourth or auxiliary epicyclic gear train compounded with the rear gear train of the trio of compounded gear trains which serve the forward speeds drive. A sun pinion driving gear 204 is formed integral of the sleeve portion 152 which through the flange portion 154 and through the latter's splined connection 156 renders the sun pinion gear 204 rotatable with the ring gear 106. The sun gear 204 has planet pinions 206 meshing therewith and these pinions are mounted to rotate on pins 208 supported by a carrier 210 which is fixed to the load shaft 20 through a splined connection 211. The pinions 206 mesh with ring gear 212 which is rotatably mounted relative to shaft 20 and is provided with external teeth 214 adapted to be engaged by pawl 216 (Fig. 8) for locking the ring gear 212 to the casing 28.

The brake bands can be operated by similar mechanisms responsive to fluid pressure controlled by suitable valving controlled to operate as desired. The fluid pressure can be provided by a pump consisting of gears 218 and 220 contained in the end wall portion 76 in the casing and such pump can be utilized also for providing fluid pressure for effecting engagement of the clutch plates 174, as well as for maintaining pressure in the fluid coupling system. Further a second pump (not shown) for providing fluid pressure for ratio actuation either for effecting engagement of the clutch plates 174 or for actuating certain of the brake bands, or both, can be provided and connected to be responsive to the output shaft 20, if desired. Gear 218 is keyed to shaft 56 which is rotatable with the power or primary input shaft 18. Suitable fluid passages in the casing lead from the pump to cylinders 222, 224 and 226 in the casing and in such cylinders are arranged pistons as indicated by numeral 228 (Figures 4 and 5), connected to and operable to actuate the three brake bands which are anchored in the casing as indicated at 230. In the cylinder 222 (Fig. 5) for the forward brake band 130 a retractor spring means 232 can be arranged as shown urging the piston to the right whereby the brake band 130 is normally expanded clear of the associate drum 114. Accordingly the fluid pressure may be controlled to reach the cylinder 222 through conduit 234 for actuating this piston to the left, with resultant clamping by the brake band 130 of the drum 114, when in the sequence of the forward speeds it is desired for the forward gear train to join the gear drive function of the other two gear trains of the forward speeds serving trio, for establishing the third speed sub-gear ratio.

In the cylinder 226 (Figs. 1 and 4) associated with the primary ratio brake band 126, a spring means 236 is arranged as shown normally to urge the piston 228 to the left and operate the brake band into clamping engagement with the drum 120. This affords that any suitable means for controlling distribution of fluid pressure alternately between the different brake cylinders and clutch cylinders, while adjusted for the power transmitting mechanism to be established in gear for initiation of the forward drive speeds sequence, will find the epicyclic gear train, of which the sun gear 94 is fixed to rotate with the primary runner 40, to be established in reactance abutment through the medium of the one-way coupling 110 and the applied brake band 126, and ready singularly to yield the highest rate multiplication primary torque ratio for initiating the output shaft in rotation. Whereupon, the engine and with it the driving member consisting of the input shaft 18 and impeller 30 being accelerated sufficiently above the idling speed range to obtain in fluid drive transmission an appreciable torque value delivery from the impeller 30 to the primary runner 40, may complete the drive between the input and the output shafts.

In the cylinder 224 (Figs. 1 and 4), for the second speed and torque range brake band 128, a spring means 236 is arranged as shown normally to urge the piston to the left and operate the brake band into clamping engagement with the drum 118. This affords that the referred to suitable means for controlling distribution of the ratio actuation fluid pressure media may, while adjusted for the power transmitting mechanism to be established aforesaid in gear for initiation of the forward drive speeds sequence, find the epicyclic gear train, of which the sun gear 98 is fixed to rotate with the secondary runner 42, to be established also in reactance abutment and ready to join and thereby increase the output speed of the output shaft driving one of the forward speeds trio of epicyclic gear trains, upon a sufficient torque value transfer taking place in fluid drive transmission from the primary runner 40 to the secondary runner 42. It will be seen that a gradually increasing value of fluid drive transmitted torque from the primary runner 40 to the secondary runner 42, thus tending to gradually bring the secondary runner 42 and the sun 98 integral therewith up to the speed of the primary runner 40 and the sun gear 94 integral therewith, will be manifest in infinitely increasing the driving speed ratio output at the carrier 134 and integral output shaft 20 therewith relative to the speed of the primary runner 40 and sun gear 94 integral therewith. Accordingly, the change from the first or primary driving speed gear ratio to a fully established second speed gear ratio may be transitional, i. e., infinitely variable. It will be seen further that progressively the transition from the full primary speed gear ratio to the full second speed gear ratio will be marked by a gradually increasing value apportionment of the torque, manifest in the fluid circuit passing through the primary runner 40, becoming fluid drive imparted to the secondary runner 42, and which would be consistent with the speed of the ring gear 106 increasing relative to the speed of the sun gear 94 and therefore an increasing ratio driving assumption on the part of the ring gear 106 and the asssociate secondary runner 42 of the torque load manifest in the output shaft 20. The fluid coupling effect between the impeller 30 and the primary runner 40, however, may continue under the requirement to deliver the full engine torque.

Sequentially an adaptation in the referred to suitable means for controlling distribution of the ratio actuation fluid pressure media may be, upon being shifted out of the position for establishing the aforesaid gear for initiation of the forward drive speeds sequence, and into a position in which to establish the third speed, to simultaneously supply fluid pressure to the cylinders 224 and 226, thereby to overrule the spring means 236 (Fig. 4) therein and thereover secure substantially simultaneous release of the brake bands 118 and 126. At substantially the same instant, but preferably with a degree of actuating effectual delay, a further adaptation of the referred to suitable means for controlling distribution of the ratio actuation fluid pressure media can be to supply fluid pressure to the cylinder 222 whereby to overrule the spring means 232 (Fig. 5) therein and thereover energize clamping by the brake band 130 of drum 114, thereby to establish reactance abutment for the forward gear train of the forward speeds trio of epicyclic gear trains to gear drive augment and in consequence increase the output speed of thus established differential gear function in the intermediately positioned epicyclic gear train, and also to augment and in consequence still further to increase the output speed of the thus continued differential gear function in the output shaft driving third epicyclic gear train. By virtue of the sun gear 96 being fixed to the input shaft and impeller 30 integral therewith, the overall result from this shift with respect to selective positions in which establishment of base reaction for gear function in the compounded trio of epicyclic gear trains may prevail, will be step change in the drive from second gear ratio, which may require delivery of the full engine torque through the fluid drive system to third speed lower rate torque multiplication gear ratio, which will split the input shaft torque for only an apportionment to be delivered through the fluid drive system as a whole. Accordingly, it will be seen that in third speed low rate torque multiplication ratio the fluid drive coupling between the primary runner 40 and the secondary runner 42 may be required to transmit only a subdivision of a primary split apportionment of the input shaft torque.

So that subsequently all of the elements of the trio of forward speeds serving gear trains may be coupled for substantially unitary rotation for direct drive fourth speed, the fluid pressure may be controlled to evacuate from the cylinder 222 (Figs. 1 and 5), allowing the spring 232 to move retractively the piston in this cylinder to the right and thereby release the brake band 130 from the drum 114, and substantially simultaneously reach the cylinders 164 to actuate the pistons 194 to in turn actuate the presser plate 176 to bring the clutch plates 174 into engagement. The arrangement when in direct drive fourth speed provides, in effect, that delivery of the torque of the input shaft 18 will be apportioned substantially as in the third speed sub-gear ratio drive, except that the engaged condition of the clutch plates 174 will add the rotation of ring gear 112 to the drive and in effect step up the speed of the carrier 142 to an extent that this member will assume a greater portion of the load torque resistance in the load shaft 20 and in turn promote the delivery of an increased portion of the torque of the input shaft 18 directly to the forward gear train via the shaft 56, and thus reduce the portion of the torque for delivery through the fluid coupling system as a whole, i. e., with respect to the fluid couple connecting impeller 30 and primary runner 40 and the secondary fluid couple connecting primary runner 40 and secondary runner 42.

In neutral

When brakes 126, 128 and 130 are released, the clutch plates 174 are disengaged and the pawl 216 (Fig. 8) is disengaged from the ring gear 212, the drive mechanism will be in neutral and no drive will be transmitted to the load shaft. In all forward speeds the pawl 216 is disengaged from the ring gear 212 so that the reverse auxiliary gear train at the extreme rear, or right, will idle.

Forward speed sequence

To place the drive mechanism in starting forward speed relation, brakes 126 and 128 are applied, brake 130 is released and clutch plates 174 are released. In this condition of the drive mechanism there will still be no appreciable torque value transmitted through the fluid coupling system to initiate drive to the load shaft until the operator accelerates the prime mover above idling speed range.

*First speed.*—The drive will pass through the operating fluid connection from impeller 30 to primary runner 40 to rotate sun gear or rotatable element 94, and ring gear 106 prevented from rotating retrograde by one-way clutch 110 and brake 126, will cause pinions 100 to track forward rotatively around within the ring gear 106 and carry the carrier 134 and load shaft 20 therewith at, for example, 3.333 to 1 ratio, respectively, of the sun gear 94 to the carrier 134. Thus the primary fluid drive couple between impeller 30 and primary runner 40 has the feature of transmitting substantially the full prime mover torque in first speed.

*Second speed.*—Assuming each of the trio of gear trains adapted to serve the forward speeds to approximate individually 3.333 to 1 reduction ratio of respective sun gear to respective carrier, when operating with their respective ring gear held stationary, when the torque transmitted by way of a secondary fluid drive couple developing between primary runner 40 and secondary runner 42 reaches a value, as primary runner 40 attains increasing speed, sufficient to individually rotate sun gear or rotatable element 98, thereby to initiate drive through 3.333 to 1 reduction gear in the intermediate gear train and in turn to initiate ring gear 106 of the rear gear train in forward speed rotation thus, in conjunction with continued drive through sun gear 94, to initiate a torque recombining gear function in the rear gear train, and thus to initiate increasing speed ratio delivery to the carrier 134 and load shaft 20, a transitional change from first speed to second speed with infinitely increasing driving speed ratio and lowering rate multiplying prime mover torque will have initiated. Thereafter as the load shaft attains higher speed and particularly the secondary runner 42 attains higher speed the slip rate between primary runner 40 and secondary runner 42 will decrease with corresponding resultant infinite graduation toward the drive reaching full second speed gear ratio, such as would prevail when the sun gears 94 and 98 attain the same speed which would result from 100 per cent efficiency of the fluid drive couples, respectively, between impeller 30 and primary runner 40 and between primary runner 40 and secondary runner 42. It will be recognized that either a reduction in load torque resistance in the load shaft 20 relative to a constant torque value in the input shaft 18, or a constant load torque resistance value in the load shaft compared with an increased power torque value in the input shaft 18, will result in increased speed driving ratio and lowering rate multiplying the torque in the gearing in the transitional change range from first speed to second speed by virtue of reduced slip rate principally between primary runner 40 and secondary runner 42. When sun gear 98 reaches the same speed as sun gear 94, the full 3.333 to 1 reduction ratio in the intermediate gear train and rotating ring gear 106 will, in conjunction with the drive through sun gear 94, result in an approximate 1.96 to 1 reduction full second speed ratio, between the sun gears 94 and 98 as a unit and the carrier 134 and integral shaft 20. Further, it will be seen that as the secondary fluid drive couple develops between runnner 40 and runner 42 and initiates sun gear 98 in rotation, pinions 104 will in turn be initiated in rotation and tracking forwardly orbitally within ring gear 116, thus to force the carrier 138 and ring gear 106 to follow rotatively therewith. Accordingly reaction is automatically shifted from one-way clutch 110, which now functions as an overrunning or free-wheel unit for ring gear 106, to brake band 128. The second speed gear ratio thus is of two-way drive capacity, i. e., connecting the load shaft, which may represent the driving wheels of a vehicle, to rotate the prime mover, as for an engine compression brake performance. It will be seen still further that in connection with the second speed drive including the intermediate gear train rotating ring gear 106 at 3.333 to 1 reduction, or lower, relative to the speed of sun gear 94, provides the feature that in establishing the second speed the secondary fluid drive couple developing between runner 40 and runner 42 is required to deliver only approximately 40 per cent of the prime mover torque, or less, while the remaining 60 per cent, or greater portion of the full prime mover torque delivered through the primary fluid drive couple effectual between impeller 30 and runner 40, will be transmitted directly to sun gear 94.

*Third speed.*—When third speed is desired, brake 128 is released, the clutch plates 174 are maintained disengaged and brake 130 is applied. This inaugurates the forward gear train in torque multiplying gear function delivering a portion of the input shaft torque in circumvention of the fluid coupling system, as at 3.333 to 1 reduction initiating ring gear or rotatable element 116 in forward speed rotation, since application of brake 130 holding ring gear or rotatable element 112 stationary will initiate pinions 102 tracking forwardly rotatively in ring gear 112 with resultant rotation of the carrier 142 and ring gear 116 therewith. The result of the forward gear train joining the gear function of the intermediate gear train is stepped-up speed rotation of carrier 138 and integral ring gear 106 of the rear gear train, closer to that of sun gear 94 and in turn resulting in stepped-up speed rotation of the carrier 134 and load shaft 20. This third speed ratio taken on a basis of 100 per cent efficiencies in the fluid coupling system will approximate 1.50 to 1, respectively, input shaft 18 relative to load shaft 20. A feature in third speed is the delivery of approximately 22 per cent of the prime mover torque directly to sun gear 96, while the primary fluid drive couple between impeller 38 and runner 40 will deliver the remaining 78 per cent, and while the subapportionment of the torque which will be delivered through the secondary fluid drive couple between runner 40 and runner 42 will approximate 30 per cent with respect to the full prime mover torque. It will be seen that third speed is also a two-way drive coordination.

*Fourth speed (direct drive).*—When fourth speed is desired brake 130 is released, brake 128 is maintained released and the clutch plates 174 are engaged to connect two of the rotatable elements. The primary, or direct result, is the establishment of the elements of the forward gear train in connection for unitary rotation with the input shaft 18, i. e., a local direct drive couple, carrying ring gear or rotatable element 116 of the intermediate gear train therewith. In conjunction with this condition, efficiencies approximating 100 per cent in the fluid coupling system will effect the inclusion of the remaining elements of the intermediate gear train and the elements of the rear gear train, and thereby including the load shaft 20 all in connection for substantially unitary rotation with the input shaft 18. A feature in fourth speed (direct drive ratio) is the delivery of approximately 50 per cent of the prime mover torque directly through the unitary coupled condition of the forward gear train, while the remaining 50 per cent of the prime mover torque will be delivered through the fluid drive coupling system as a whole. Of this 50 per cent of the torque for delivery through the fluid coupling system less than one half or approximately 20 per cent of the engine torque may be delivered through the fluid coupling effect between runner 40 and runner 42.

*Reverse drive*

To obtain reverse drive brakes 126, 128 and 130 are released, the clutch plates 174 are released and the pawl 216 (Fig. 8) is brought into engagement with the peripheral teeth on ring gear member 212. The drive will be from the primary runner 40 to shaft 22 to sun gear 94. The reaction ring gear 106 is free to rotate reversely. In conjunction with forward rotation of sun gear 94 reaction from carrier 134 through pinions 100 will drive them reversely and in turn drive ring gear 106 reversely and with the latter the integral sun gear 204, at approximately 2.333 to 1 reduction from sun gear 94 to ring gear 106 and integral sun gear 204. Due to torque coming from pinions 206 in reverse drive being greater than torque on shaft 20 in forward direction, shaft 20 will be driven reversely at reduced speed.

*To lock the drive to prevent vehicle movement when selected in reverse drive*

A motor vehicle equipped with this drive system, if desired, may be parked locked against movement in either direction by bringing the pawl 216 (Fig. 8) into mesh with the peripheral teeth on ring gear 212. It follows in an adaptation (Fig. 4) for the brakes 126 and 128 to be normally spring means energized, respectively, holding the ring gear 106 and ring gear 116, any tendency on the part of the load shaft 20 and integral carrier 210, representing the vehicle driving wheels, to rotate forwardly will tend to progressively rotate the pinions 206 forwardly around in the track of the ring gear 212, to drive the sun gear 204 forwardly at increased speed ratio and the integral ring gear 106 and carrier 138 therewith, thereupon to carry pinions 104 rotatively forwardly so that tracking in their held reaction ring gear 116 they will tend to rotate sun gear 98 forwardly at further or compounding increased speed ratio and as a result driving shaft 66 and integral cam lobe 68 forwardly therewith, thereby wedging clutch roller members 54 in the concentric annulus 50 and thus to rotate impeller 30 and integral flywheel cover 36 and flywheel flange 32 and input shaft 18 with the shaft 66. In example, the input shaft 18 may comprise the output end of the vehicle engine crank shaft, thus completing the drive to find the vehicle locked in a highly efficient brake effective gear ratio with respect to movement forwardly against the engine compression. This feature of the one-way clutch provision (Fig. 6) through which to drive the prime mover under the influence of the load through a portion of a compounded plurality of epicyclic gear trains, and especially in connection with establishment of the drive mechanism in reverse drive, is important in drive circumventing a fluid coupling system through a highly efficient engine compression brake effective gear ratio. In the same setting, the pawl 216 engaged with the ring gear 212, any tendency of shaft 20 and integral carrier 210, representing the vehicle driving wheels, to rotate reversely will carry the pinions 206 therewith to track in the held ring gear 212, and thereby tend to rotate sun gear 204 and integral inner race 108 of one-way clutch 110 reversely but at increased speed ratio relative to shaft 20, while a normal state of brake band 126 clamping drum 120 providing established reaction abutment for the internal cam-shaped annulus 122 will secure wedging action on the part of the roller clutch members 124 between the inner race 108 and annulus 122, thus in conjunction with sprag engagement of pawl 216 with the member comprising gear 212 tending to lock the plant pinions 206 in reaction abutment against rotation under the influence of any tendency on the part of their carrier 210 and integral load shift 2, representing the vehicle driving wheels, to rotate backwards. This adaptation for a one-way clutch provision, adapted in an establishment of the drive mechanism for forward speeds sequence to contribute to reaction abutment connections for forward drive gear ratio, to cooperate in another instance, i. e., established in reverse gear, with brake, or sprag mechanism, adapted for establishing the drive in reverse to lock the load shaft, representing the vehicle propeller shaft and vehicle driving wheels, to the transmission case against rotating backwards, is an important adjunct related to utility of the drive transmitting arrangements for parking the vehicle in gear.

As previously stated any suitable means can be provided for controlling the fluid pressure for applying, or releasing, the brakes, as the adaptation may be, and engaging the plate clutch. It will be seen that the actuation control is progressive in securing a sequence of four forward speed ratios, which is important with respect to obtaining smoother transition in effecting the change from one gear ratio to another and for simplifying actuation and control means, as compared with drive mechanisms which impose adjustment of a given gearing group from that for gear drive function to connections for unitary rotation contributory to effecting a change from a given driving speed ratio to a given relatively higher speed driving ratio of the sequence, and in which subsequently, for the same gearing group, readjustment is imposed from that for unitary rotation back to that for gear drive function contributory to obtaining a change from the given relatively higher driving speed ratio to a still higher driving speed ratio. Features of the arrangement which contribute appreciably to the unusually simple ratio actuation and control means requirements in this drive system are, the plurality of relatively rotatable primary driving gear elements complementally of the plurality of epicyclic gear trains compounded for gear drive, or for direct drive, recombining of divided input torque before delivery to the load shaft; coupled with the provisions for and the adaptation of a fluid drive couple, adapted to develop in sequence of the drive initiating in low gear ratio, to effect ratio change from the low gear ratio to second gear ratio and in so doing the respective fluid coupling effect being required to deliver only a portion of the prime mover torque; and further coupled with brake and plate clutch means, adapted for fluid pressure actuation, for effecting the ratio changes in the higher speeds.

Referring now to Fig. 10 illustrative of a second application of the invention, drive member 318 is the primary input shaft and can represent a vehicle engine crank shaft. Output shaft 320 is the driven member or tail shaft and can be connected with a device to be driven, such as wheels of a motor vehicle (not shown). An intermediate shaft 322 integral with a sun gear 394 is arranged between and in alignment with the input shaft and the output shaft, the forward end of shaft 322 projecting into a recess in the input shaft and being carried therein by bearing 324 and the rear end of shaft 322 projecting into a recess in the output shaft and being carried therein by bearing 326.

As in Fig. 1, reverse drive and plural forward speed drives are obtained through a fluid coupling system and compounded epicyclic gear trains which are supported and housed in casing 328 formed in two parts 382 and 384, with an intermediate wall 348 secured therebetween and supporting a bearing 350, and including end enclosure walls 386 and 390. The forward wall 386 supporting bearing 388 and the rear wall 390 supporting bearing 392.

A tubular second driven intermediate shaft 366 integral with sun gear 398 immediately encompasses an intermediate portion of shaft 322. A driving intermediate input shaft 356 keyed to carrier 342 at a hub portion 343 thereof immediately encompasses an intermediate portion of shaft 366. Flange 402 of hub 404 is fixed by splined connection 406 to ring gear 312 and immediately encompasses an intermediate portion of shaft 356. Integral ring gear 312 and hub 404, being rotatable with cover 336, of rotatable casing 408 for housing the fluid coupling fly-wheel system, by splined connection 410 and by virtue of cover 336 being fixed by bolts 338 to flange 332 of casing 408 and flange 332 being fixed by bolts 334 to shaft 318, finds ring gear 312 rotatable with the driving primary input shaft 318.

In this arrangement a pair of compounded epicyclic gear trains are in driven relation with the fluid coupling system and constitute the driven or second multi-speed gearing group through which the output shaft 320 is driven, while a third epicyclic gear train 301, compounded with the multi-speed gearing group pair of gear trains, is arranged directly driven from the input shaft 318 and constitutes the first multi-speed gearing group and through which the fluid flywheel drive coupling system is adapted to be driven from the input shaft 318. Forward speed drive is obtained through the combine of these, the first multi-speed gearing group, the fluid coupling system and the second multi-speed gearing group.

This arrangement differs as compared with the drive system illustrated in Fig. 1, principally in that the input torque from the prime mover via the input shaft 318 is split, or divided, in certain of the higher speeds, between delivery of a portion through the fluid coupling system and delivery of the remaining portion directly in circumvention of the fluid coupling system after the torque is delivered through the first multi-speed gearing group at either of the multiple speed ratios of the latter. Another differentiation appearing in this arrangement as compared with the disclosures in Fig. 1 is the provision of two brake bands with the one-way clutch 310 for serving reaction to the low speed first gear train of the second multi-speed gearing group arranged in series with the brake band serving the second gear train of the same multi-speed gearing group.

A further difference in this arrangement, as compared with that illustrated in Fig. 1, is the provision of a separate plate clutch unit for connecting the elements of the third epicyclic gear train, constituting the first multi-speed gearing group 301 in this arrangement, for unitary rotation, i. e., local direct drive couple effect, while the first plate clutch unit, comparable to that included in the design followed in Fig. 1, is retained for establishing the elements of the compounded pair of gear trains forming the second multi-speed gearing group for unitary rotation, i. e., local direct drive couple in conjunction with the cooperation of the fluid coupling system. Still another differentiation appearing in this arrangement is the connection of the sun gear, of the fourth epicyclic gear train through which reverse drive is obtained, rotatable with the ring gear of the forward gear train of the second multi-speed gearing group whereby an applied condition of the brake band for holding the respective ring gear will also hold the respective sun gear.

Planet pinions 302 meshing with ring gear 312 are mounted to rotate on pins 340 supported on carrier 342, and sun gear 396 meshing with pinions 302 has an internally splined integral drum 314 which together with an interconnecting end head portion 418 thereof serves as a housing for the plate clutch unit for this gearing group. Carrier 342 has a reduced diameter slotted portion 412 disposed within the drum 314 and clutch plates 414 alternately engage the drum splines and the carrier slots to establish a clutched relation therebetween when clutch packed together. Cylinders 416 are formed in the header 418 and contain pistons 420 adapted when fluid pressure is introduced between the respective cylinder head and piston to thrust presser clutch plate 422, which also engages the splines in drum 314, forward to pack the plates 414 against bottom pressure plate 424 which latter is fixed by splined connection 426 to drum 314.

A spring 428 is disposed encompassing the sleeve portion 430 of sun gear 396 and engages presser plate 422 with an actuating influence effective to urge the latter rearward retractively to release plates 414 when fluid pressure is allowed to escape from between the pistons and the respective cylinder heads. Fluid under pressure can pass through conduit 432 formed in a portion 434 of casing 328 to passages 436 and 438 and into the drum cylinders for actuating pistons 420 to press presser plate 422 in clutch engaging direction. The drum 314 rotation is controlled by brake band 330.

Of the second multi-speed gearing group planet pinions 300 of the rear gear train mesh with sun gear 394 and planet pinions 304 of the front gear train mesh with sun gear 398. Ring gear 316 is fixed to drum 440 by bolts 442 and meshes with planet pinions 304. The drum 440 rotation is controlled by brake band 444. The planet pinions 304 are mounted to rotate on pins 446 supported on a carrier 448, while planet pinions 300 mounted to rotate on pins 450 supported by a carrier 452 mesh with both sun gear 394 and ring gear 306. These two gear trains constituting the second multi-speed gearing group are compounded by fixing the carrier 448 to ring gear 306 through means of a splined connection 346.

In this arrangement, differentiating from that shown in Fig. 1, the one-way clutch 310, through which reaction for the ring gear 306 of the rear gear train of this pair is obtained, cooperates directly with drum 440 for ring gear 316, by which arrangement of the one-way clutch reaction for ring gear 306, i. e., for the rear gear train, is completable by brake band 444 which primarily is the brake for holding ring gear 316 stationary, i. e., for providing reaction for the front gear train of this pair. To this end the concentric inner race 308 of the one-way clutch is fixed to the forward end of carrier 448 by means of dowel pin 454 and in turn by the splined connection 346 is fixed to ring gear 306, while the internally cammed annulus 456 of the one-way clutch is fixed to drum 440 by means of splined connection 458. By this arrangement release of brake band 444 renders each gear train of this compounded pair free. The brake band 444 when clamped on the drum 440 will hold the annulus 456 as well as the ring gear 316, thus providing an abutment on which the roller clutch members 324 wedge to hold the ring gear 306 stationary with respect to any tendency of the latter to rotate retrograde with respect to forward speed input power rotation on the part of sun gear 394. The arrangement further enables reaction by way of brake band 444 to shift from ring gear 306 to ring gear 316 when the torque in sun gear 398 reaches a value sufficient to rotate ring gear 306 through the reduction ratio of gears 398 and 304 against 316 and permitted by overrun action in the one-way clutch.

The drum 440 is internally splined and serves as a housing for a clutch adapted for establishing this second multi-speed gearing group in direct drive coupling effect and such housing consists of an end wall portion 360 of drum 440 and in which end wall a plurality of cylinders 364 are formed each provided with a piston 470. Fluid under pressure can pass through conduit 460 formed in the portion 434 of casing 328 to passages 462 and 464 and into the clearance between the head of the respective cylinder and the piston therein for actuating the latter to in turn press presser clutch plate 376 in clutch engaging direction. Externally splined hub 370 is fixed to shaft 356 by means of splined connection 371, and clutch plates 374 alternately engage the splines of drum 440 and the splines of hub 370, while bottom pressure clutch plate 380 is fixed to drum 440 by means of splined connection 382. Presser plate 376 also engages the splines of drum 440. Springs 381 are seated on the forward side of the end wall 360 with respect to presser plate 376 and respectively are compressed between a washer 383, secured on bolt 385 by a pin 387, and the end wall 360, and the bolt 385 in turn is threaded into an aperture provided therefor in presser plate 376, all whereby the combined effort of the series of springs 381 is adapted to actuate presser plate 376 in a clutch disengaging direction when there is an escape provided for fluid pressure behind pistons 470.

The brake bands can be operated by similar mechanisms responsive, in one of applying and releasing directions, by fluid pressure controlled by suitable means as desired. The fluid pressure can be provided by a pump consisting of gears 472 and 474 contained in a housing member 376 fitted to casing 328 and which housing member also supports oil seal 372, the sealing element of which frictionally engages the periphery of hub 344 which is fixed to cover 336 by means of a welded fillet 476. The same gear pump can also be utilized for maintaining pressure in the fluid coupling. Gear 472 is keyed to hub 404 that is driven directly from the drive shaft 318. Suitable fluid passages in the casing lead from the gear pump to the conduits 432 and 460 and also to cylinders 522 and 524 (Figs. 5 and 4, respectively) and in each such cylinders are arranged pistons 528 connected to and operable to actuate the two brake bands which are anchored in the casing as indicated at 530.

In cylinder 522 for brake band 330 (Fig. 5), the spring may be arranged as a retractor whereby to effect normal release of this brake band. This will render the first multi-speed gearing group normally free, thus precluding appreciable speed delivery to the fluid coupling, until the gear pump, with the prime mover, is accelerated above idling range, whereby to then effect sufficient fluid pressure for the piston in cylinder 522 to energize effective clamping by band 330 of drum 314. Differentially, in cylinder 524 for brake band 444 (Fig. 4), the spring may be provided of appreciably greater pressure value and may be arranged to energize application of brake band 444 whereby normally the second multi-speed gearing group will be established in reaction ready to gear drive when sufficient torque delivery initiates in the fluid coupling. Accordingly, for the second multi-speed gearing group, fluid pressure will be utilized in cylinder 524 to overrule the spring and secure release of brake band 444, thus either to establish the drive mechanism in neutral, or in favor of the clutch plates 374 being brought into engagement for direct drive coupling the second multi-speed gearing group.

The fluid drive coupling means can complementally correspond with that illustrated in Fig. 1 and consists of impeller 478 fixed to hub 480 by rivets 482 and in turn being rotatable with shaft 356 by means of splined connection 464. Thus in this arrangement the fluid drive coupling component is driven from the first multi-speed gearing group through shaft 356, instead of directly by shaft 318, as in Fig. 1. The fluid coupling may further consist of the relatively rotatable primary and secondary runners 486 and 488. Runner 486 being fixed to hub 490 by cap screws 492 and in turn hub 490 being connected rotatably with shaft 322 by means of splined connection 494, while runner 488 is fixed to hub 496 by rivets 498 and in turn hub 496 being rotatable with shaft 356 by splined connection 500.

Reverse drive is obtained, similar to Fig. 1, through a fourth planetary, or epicyclic, gear train compounded with the forward drive gear trains and directly associated with the forward gear train of the second multi-speed gearing group. A sun gear 540 has planet pinions 542 meshing therewith and these pinions are mounted on pins 543 supported on carrier 502, the latter being fixed to output shaft 320 by splined connection 504. The pinions 542 mesh with ring gear 506 which is peripherally toothed as indicated by numeral 508 to be engaged by pawl 510 (Fig. 8) for holding ring gear 506 stationary. Sun gear 540 is integral with flange 512 which is fixed to ring gear 316 by slot and jaw connection indicated by numeral 514.

Neutral

When brakes 330 and 444 are released and clutch plates 374 and 414 disengaged, and pawl 510 (Fig. 8) is disengaged from ring gear 506, the drive mechanism will be in neutral and no drive will be transmitted to the output shaft 320. In all forward speeds the reverse pawl 510 is disengaged from ring gear 506.

Four forward speeds sequence ability in Fig. 10

To place the drive mechanism in starting forward speed relation, brakes 330 and 444 are applied and clutch plates 414 as well as clutch plates 374 are released. In this relation of the drive mechanism there will still be no appreciable drive effect transmitted until the input shaft 318 is accelerated, above idling speed range, sufficiently to develop hydrodynamic couple between impeller 478 and primary runner 486, this juncture in the drive mechanism operating as the speed responsive initial drive automatic clutch.

*First speed.*—The drive will pass through the primary driving member body consisting of parts 318—332, 336 and 344 to integral hub 404 and ring gear 312, thence through, by way of example, 1.40 to 1 reduction ratio from ring gear 312 via planets 302, to carrier 342 and integral shaft 356 and impeller 478, by virtue of brake 330 holding sun gear 396. From impeller 478 the drive is thence by fluid couple to primary runner 486 and integral shaft 322 and sun gear 394, thence, by way of example, 2.75 to 1 reduction ratio from sun gear 394 through planets 300 to carrier 452 and integral output shaft 320, by virtue of the chain one-way clutch 310 and brake 444 holding ring gear 306. The compounded reduction ratio of the first and second multi-speed gearing groups thus is approximately 3.85 to 1 for initiating output shaft 320 in rotation from input shaft 318.

*Transitional change to second speed gear ratio* will begin while brake bands 330 and 444 are retained applied and clutch plates 414 and clutch plates 374, respectively, are maintained disengaged, all as in first speed, when torque delivery by the secondary fluid drive coupling effect from primary runner 486 to secondary runner 488 reaches a sufficient ratio, compared with the load torque resistance in output shaft 320, by which sun gear 398 will rotate planet pinions 304 to initiate the latter in tracking relation rotatively in the stationary held ring gear 316, thus through carrier 448 to initiate ring gear 306 in reduced speed forward drive rotation joining in the drive with sun gear 394. The result is the beginning of the transition upward from the first speed gear ratio, increasing the driving speed above the latter, and lowering the rate multiplying the torque effectual as the slip rate reduces between runners 486 and 488 and culminative in full second speed gear ratio when secondary runner 488 attains unitary rotation with primary runner 486.

Assuming that the reduction ratio of the forward epicyclic train of the compounded pair of gear trains constituting the second multi-speed gearing group individually corresponds with that of the rear gear train of the same pair, i. e., approximately 2.75 to 1, the full ratio reduction gear drive by this compounded pair will approximate 1.68 to 1. Thus the second gearing group compounding the 1.40 to 1 reduction output of the first gearing group will provide a full ratio second speed reduction gear drive of approximately 2.35 to 1 between shaft 318 and 320 when the fluid turbines are operating at 100% efficiencies. It will be seen that the fluid drive coupling effect between runners 486 and 488 will take and deliver only a portion of the full torque of shaft 356 delivered through the primary fluid drive coupling effect between impeller 478 and runner 486.

Thus in establishing second speed the secondary fluid drive couple between runners 486 and 488 divides the torque for an appreciable portion to be continued in delivery through the integral runner 486 and shaft 322 and sun gear 394 while the remaining portion of the full torque of shaft 356, primarily delivered through the fluid drive coupling effect between impeller 478 and runner 486, will be taken by runner 488 and delivered through integral shaft 366 therewith to sun gear 398. This represents an important improvement in drive through fluid turbines, particularly in which a fluid coupling effect is adapted to cause ratio change speed upwards in associate multiple speed gearing, and especially in fluid turbines in which such a ratio change is obtained between primary and secondary runners complementally with an impeller of one hydraulic circuit wherein the secondary runner driving the ratio change speed upwards effect in the gearing will represent only a portion of the full lever arm value of the hydraulic circuit.

*Third speed* is attained supplantively over second speed and is established by clutch plates 374 being brought into an engaged condition substantially simultaneously with the release of brake 444, while brake 330 remains engaged and clutch plates 414 are maintained released. The engaged clutch plates 374 with the cooperation of the plural fluid drive couples, respectively, effective between impeller 478 and runner 486, and between runners 486 and 488 establish the elements of the compounded pair of epicyclic gear trains constituting the second multi-speed gearing group in direct drive effective couple and as such effective to transmit the 1.40 to 1 ratio of the first gearing group to shaft 320 when the fluid turbines are operating of 100% efficiencies. Thus the carried over 1.40 to 1 reduction ratio by the first gearing group constitutes the basis of the third speed. It will be seen that in this speed the engaged clutch plates 374 will primarily split the torque of shaft 356 for only a portion to be taken therefrom by the fluid couple between impeller 478 and runner 486. Further it wil be seen that the secondary buid couple between runners 486 and 488 will subdivide the portion of the torque of shaft 356 delivered through the fluid coupling from impeller 478 to runner 486 for only a subdivided portion to continue in delivery through the integral runner 486 and shaft 322 and sun gear 394. The other sub-divided portion is delivered through integral runner 488 and shaft 366 and sun gear 398.

In conjunction with these features of primary and subdividing of the torque, it will be seen that the parallel driving effects through sun gears 394 and 398, coupled with the third parallel driving effect through ring gear 316, will induce the resultant direct drive coupling effect of the remaining elements of the compounded pair of epicyclic trains to recombine both the primary and the sub-divisions of the torque before delivery to shaft 320 at the third speed torque value of the 1.40 to 1 reduction in the first gearing group. Thus the improvements aforementioned in connection with a fluid coupling effect in the turbines being adapted to cause ratio speed change upwards in associate multiple speed gearing is still further amplified in connection with participation of this fluid coupling effect in third speed.

*Fourth speed* (direct drive) is attained supplementively over third speed by retaining brake 444 released and clutch plates 374 engaged and thereover releasing brake 330 and engaging clutch plates 414. The result is direct drive couple of the elements of the first gearing group by the engaged clutch plates 414 and which, supplementing the direct drive coupled condition of the elements of the compounded pair of gear trains forming the second gearing group and as effected jointly by the first and the second fluid coupling effects in the turbines and the engaged clutch plates 374, renders the drive in direct drive between shafts 318 and 320. It will be seen that in direct drive, fourth speed, the same condition and results with respect to primarily dividing, and in turn sub-dividing, the torque taken from shaft 356 will prevail as in third speed, except that advantageously with respect to still further reducing the torque value for delivery either through the primary fluid drive couple between impeller 478 and runner 486, or through the secondary fluid drive couple between runners 486 and 488, and reduction in the torque value for delivery through clutch plates 374, multiplication of the prime mover torque in the first gearing group as input to shaft 356 will have ceased in favor of 1 to 1 ratio transmission of the prime mover torque therethrough.

In this arrangement the primary fluid drive coupling effect in the turbines has the feature of taking the full input torque in the two lower forward speeds at the multiplied value effected in the first gearing group and approximately only 60% in the two higher speeds of the drive. In the highest speed, however, as compared to the next-under-the-highest speed the 60% will represent a lower torque value since in the highest speed multiplication of the torque in the first gearing will have ceased. In second speed the secondary fluid drive couple effect in the turbines, which upon its inception as an appreciable drive value is adapted to establish this speed, has the feature of taking approximately only 40% of the output torque of the first gearing group, i. e., the torque of shaft 356, and approximately only 23% in either the third speed or the fourth speed. In fourth speed the 23% will represent an appreciably lower value than in third speed since in the latter multiplication of the torque in the first gearing group is included as compared to 1 to 1 ratio drive therethrough in fourth speed. In fourth speed the engaged clutch plates 374 adapted for establishing this speed have the feature of taking approximately only 40% of the prime mover torque.

*Alternate five forward speeds sequence attainable in Figure 10*

*First and second speeds* are attained from the same sequence of conditions as hereinbefore described in connection with the corresponding speeds in the Four Forward Speeds Sequence.

*Third speed* is attained supplantively to second speed by maintaining brake 444 applied, maintaining clutch plates 374 released, releasing brake 330 and engaging clutch plates 414. The drive is then from shaft 318 through unitary rotation of the first gearing group thereby including shaft 356 in 1 to 1 ratio with shaft 318, through impeller 478 to impeller 486, thence in divided torque parallel power flow, one portion of the torque in runner 486 drive transmitted by way of integral shaft and sun gear 322 and 394 to planet pinions 300, while the remaining portion of the torque is runner 486 drive transmitted by way of runner 488 and integral shaft 366 and sun gear 398 to planet pinions 304, thence at the 2.75 to 1 reduction ratio of this gear train to carrier 448 and integral ring gear 306, thence from ring gear 306 to planets 300 and for recombining in the latter with the torque also delivered thereto through sun gear 394, and thence to integral carrier 452 and shaft 320. The combine of these two epicyclic trains, complemented by the sun gears 394 and 398, in gear function yield approximately 1.68 to 1 reduction ratio third speed transmitting the direct drive couple effect of the drive through the first gearing group when the fluid turbines are operating at 100% efficiencies.

*Fourth speed* is accomplished supplantively to third speed by releasing brake 444 and clutch plates 414 and applying brake 330 and engaging clutch plates 374. Drive will be from shaft 318 through the reestablished 1.40 to 1 reduction ratio of the first gearing group to shaft 356, thence the torque is primarily divided in shaft 356, one portion going by way of engaged clutch plates 374 to ring gear 316 to planet pinions 304, while the remaining primary division goes by way of impeller 478 to runner 486. The last-named primary division is subdivided, one subdivision going by way of runner 488 and integral shaft 366 and sun gear 398 to planet pinions 304, while the remaining sub-division goes directly from runner 486 to integral shaft 322 and sun gear 394 to planets 300. The torques of sun gear 398 and ring gear 316 recombine in planets 304 and pass therefrom by way of integral carrier 448 and ring gear 306 to planets 300, the latter thus finally recombining the torques of sun gear 394 and ring gear 306 to drive integral carrier 452 and shaft 320 at the 1.40 to 1 reduction ratio of the drive through the first gearing group when the turbines are operating at 100% efficiencies.

*Fifth speed* (direct drive) is accomplished supplantively over fourth speed by releasing brake 330 and engaging clutch plates 414, over retained release condition of brake 444 and retained engaged condition of clutch plates 374, thus establishing direct drive couple from shaft 318 through to shaft 320 using the full mutiplex fluid drive coupling effects of the turbines and the two clutching units of clutch plates 414 and 374.

In this Five Forward Speed Sequence adaptation the primary fluid coupling effect between impeller 478 and runner 486 will have the feature of taking the full input torque in the three lower speeds and approximately 60% in the two higher speeds, while the second fluid coupling effect between runners 486 and 488 will have the feature of taking only a sub-division of the full input torque value in the four higher speeds.

*In neutral*

In this arrangement, whether adapted for the Four or the Five Forward Speeds Sequence, the drive mechanism will be released between shafts 318 and 320 when the brakes 330 and 444 and the two clutching units of clutch plates 414 and 374 are all released, or when neither the clutch plates nor the brake band cooperable with one of the first and the second multi-speed gearing groups is engaged or applied while either the clutch plates or the brake cooperable with the other of the first and the second multi-speed gearing group is engaged or applied.

*Reverse drive*

In this arrangement, whether adapted to yield the Four or the Five Forward Speed Sequence, the drive is established in reverse gear by a released condition of the brake 444 and the clutch plates 374, engagement of pawl 510 (Fig. 8) with the toothed periphery 508 of ring gear 506, and either an applied condition of brake 330 or alternately an engaged condition of clutch plates 414. Whatever the ratio selection of the first gearing group the drive for reverse will be from shaft 318 through integral parts therewith 332, 336, 418, 404, 402 to ring gear 312, therefrom through planets 302 to carrier 342 and integral shaft 356 and impeller 478, from the latter through fluid couple to runner 486, thence through second fluid couple to runner 488 and therefrom through integral shaft 366 to sun 398, from the latter the speed will reverse in planets 304 driving ring gear 316 in reverse and with it integral sun gear 540, thence planets 542 tracking rotatively in held ring gear 506 will drive carrier 502 and integral shaft 320 still in reverse but at further reduction and increased torque received from the reaction of ring gear 506. The combined forward speed torques of sun gears 394 and 398, in conjunction with the torque in shaft 320 and integral carrier 452 being greater than the torque in ring gear 316 will obtain reversed rotation of the latter with respect to sun gears 394 and 398, and in driving continuity compounding of that reversed rotation between sun gear 540 and the carrier 502 and integral shaft 320.

Referring to Figs. 11, 12, 13, 14 and 15 illustrative of a third embodiment of the invention adapted to yield a sequence of three forward speeds and alternately reverse drive, drive shaft 600 is the input member and can be connected with a suitable source of power, such as an engine (not shown) or can represent the engine crankshaft. Output shaft 602 is the all speeds driven member and can be connected with the device to be driven, such as wheels of a motor vehicle (not shown) and can be considered the load shaft. Two concentric intermediate shafts 604 and 606 are arranged between and in alignment with the input shaft and the output shaft, the forward end of the inner shaft 604 projecting into a recess in the input shaft and being carried therein by bearing 608 and the rear end of shaft 604 projecting into a recess in the output shaft and being carried by a bearing 609 mounted therein.

Reverse drive and the plural forward speed drives are obtained through a fluid coupling system of turbine wheels, which may correspond to those in the fluid coupling system in either of the preceding embodiments of the invention, but which in this example are differentially arranged so that the primary runner can conveniently drive the outer intermediate shaft 606 and the secondary runner can conveniently drive the inner intermediate shaft 604. Accordingly, casing 612 comprises a flywheel disk 614 fixed to shaft 606 by bolts 616, a cover or shell 618 fixed to disk 614 by bolts 620 and a tubular shaft extension 622 of the driving member input shaft body fixed to the cover 618 by bolts 624, the impeller 626 of the fluid turbines coupling system being suitably fixed (not shown) to flywheel disk 614 and thereby being rotatable with input shaft 600.

The sealing element of an oil seal unit 628 supported in a recessed provision therefor in tubular shaft 622 frictionally engages the periphery of hub 630 which is fixed by bolts 632 to primary runner 634, the latter being so disposed as to receive the circulated fluid discharged from impeller 626. Secondary runner 636 is so disposed as to receive the circulated fluid discharged from primary runner 634 and to discharge the fluid therefrom to impeller 626. Runner 636 is fixed to hub 638 by bolts 640 and in turn hub 638 is rotatable with shaft 604 by means of splined connection 644. The sealing element of an oil seal unit 645 frictionally engages shaft 604 and prevents oil leakage from within casing 612 between shaft 604 and hub 630.

Housing 646 for encasing the multiple speed gearing is fixed to bell housing 648 by bolts 650, the transverse wall portion 652 of the bell housing forms the forward end wall for housing 646 and supports therewith an annulus 654 which in turn supports unit 656 which frictionally engages the periphery of shaft 622 therewith to seal the compartment within housing 646 against oil leakage into bell housing 648. Shaft 602 is journaled in bearing 658 which in turn is supported by rear wall portion 660 of housing 646.

A pair of compounded epicyclic gear trains constitute the three forward speed gear set, while a third epicyclic gear train disposed relatively to the rear is adapted for use in establishing the drive in reverse. The forward epicyclic train of the forward speed gear set includes sun gear 662 rotatable with shaft 606 by means of splined connection 664, thus the forward epicyclic train is connected to be primarily driven for torque multiplying gear function therein individually by the fluid coupling effectual between impeller 626 and primary runner 634. The forward epicyclic train further comprises planet pinions 666 in mesh with sun gear 662 and mounted to rotate on pins 668 supported on carrier 670, and ring gear 672 in mesh with planets 666. The rear epicyclic train of the pair forming the forward speed gear set includes sun gear 674 fixed to shaft 604 by key 676, thus the rear epicyclic gear train of the compounded pair for forward speeds is connected to be primarily driven for torque multiplying gear function therein individually by the second fluid drive coupling effect which is adapted to take place between runners 634 and 636.

This rear epicyclic train further comprises planet pinions 678 in mesh with sun gear 674 and mounted to rotate on pins 680 supported on carrier 682 which can be an integral flange portion of output shaft 602, and ring gear 684 in mesh with planet pinions 678 and fixed to carrier 670 by means of splined connection 686; thus ring gear 684 constitutes a second driving gear element of the rear epicyclic train of the forward speeds group adapted to be driven from input shaft 600 finally through either speed ratio of the forward epicyclic gear train while sun gear 674 is adapted to be only directly driven from input shaft 600 by way of the secondary coupling effect of the hydraulic circuit in the multiple drive fluid flywheel. Planet pinions 678 are seen to be adapted to recombine the divided input torque before delivery to carrier 682 and integral output shaft 602. Carrier 682 can be constructed in two parts fixed to each other by bolt versions of pins 680 upon which planets 678 are mounted to rotate, thus carrier 682 can form an integral extension of output shaft 602 projecting through the assembly of the rear epicyclic gear train and terminating as a hub portion 683 within the plane of carrier 670.

So that the forward epicyclic gear train, in this arrangement driven by the primary runner 634 and also remotely disposed with respect to output shaft 602, may apply its high torque rate multiplying the torque ratio output directly to out-put shaft 602 from carrier 670 as the primary gear ratio for initiating shaft 602 in rotation, one-way clutch 610 (Fig. 12) is arranged with its driving annulus 688 fixed to carrier 670 by means of dowel pin 690, with its driven externally cam lobed member 692 fixed to hub 683 of integral carrier 682 and output shaft 602 by means of splined connection 694, and with its roller clutch members 696 adapted to be rolled by annulus 688 into wedging relation with respect to the cam lobes on driven hub 692. Thus the reduction ratio of the forward epicyclic train is adapted to drive output shaft 602 as the primary gear ratio thereto independently of the gears 674, 678 and 684.

Ring gear 672 is fixed to drum 698 by bolts 700, and annulus 702 of a one-way reactance clutch unit 704 (Fig. 13) is secured to drum 698 by bolts 706, and the externally cam lobed free hub member 708 is related to annulus 702 through roller clutch members 710 and is also internally toothed as indicated by numeral 712 for engagement by corresponding teeth 714 formed on the inner end of a solely reciprocal pawl 716, such engagement to take place when the latter is shifted into outward extreme position. In this manner the forward epicyclic gear train is establishable in reaction to prevent ring gear 672 rotating retrograde relative to forward speed input power rotation on the part of sun gear 662, and thereby the drive is established for forward speeds sequence between shaft 600 and shaft 602. A feature of this arrangement is the enablement of ring gear 672, of an epicyclic gear train the primary driving sun gear member of which is connected to be power driven by a fluid coupling, to be individually connected to be power rotated in forward speed without individual actuation release of brake means for holding the respective ring gear.

The third epicyclic gear train through the medium of which the drive is adapted to be established in reverse drive gear comprises ring gear 718, the periphery of which is externally toothed as indicated by numeral 720 with which corresponding teeth 722 on pawl 716 are adapted to be engaged when the pawl is shifted into its inwardly extreme position. This gear train further comprises sun gear 724 which can be integral with ring gear 684, and planet pinions 726 in mesh with both sun gear 724 and ring gear 718 and mounted to rotate on pins 728 supported by carrier 729 which is fixed to output shaft 602 by means of splined connection 732. Three detents 734 are formed in the side of pawl 716 and are adapted to be selectively engaged by a spring loaded latch member 736 respectively, to assist in restraining reciprocal movement of pawl 716 out of either its inner extreme position, outer extreme position or intermediate position. Pawl 716 and an actuating crank 738 therewith are both operatively mounted in sub-housing member 740 detachably secured to housing 646 by bolts 742.

A plate clutch 744 is comprised of a bottom pressure clutch plate 746 clamped into fixed position with ring gear 672 by a clutch housing member 748 and both fixedly attached to ring gear 672 by bolts 750. Slots 752 are formed in member 748 and receive correspondingly radially protruding portions 754 of presser clutch plate 756 thus rendered rotatable with but axially movable relative to housing 748 and integral ring gear 672. The major diameter bore of housing 748 is splined as indicated by numeral 758 and externally splined hub 760 is fixed to shaft 622 by means of splined connection 762. Clutch plates 764 alternately engage the internal splines of housing 748 and the external splines of hub 760, whereby an engaged condition of plates 764 will connect ring gear 672 for rotation with shaft 622 as compared to sun gear 662 being rotatable with intermediate shaft 606. It will be seen that an engaged condition of clutch plates 764 will, in conjunction with the effects of the primary fluid couple between impeller 626 and primary runner 634, establish the elements of the forward epicyclic gear train in direct drive coupling effect which, unless the speed of secondary runner 636 maintains slightly above that of carrier 670 and integral ring gear 684, will find the direct drive coupled forward epicyclic gear train driving output shaft 602 directly, and independently of runner 636 and the gears 674, 678 and 684, through the medium of one-way clutch unit 610.

This important feature resulting from the peculiar relationship between the runners and the respectively positioned epicyclic gear trains combined with the peculiar disposition of the one-way clutch unit, assures that a condition of the primary fluid coupling effect, between impeller 626 and primary runner 634, taking delivery of a minor portion of the torque of shaft 600, while plate clutch 744 can take and deliver the remaining major portion, can direct drive shaft 602 from shaft 600 without dependency upon the secondary fluid coupling effect or the secondary runner 636, and accordingly also without dependency upon any assistance from gears 674, 678 and 684. This does not mean, however, that in direct drive the load shaft 602 can free-wheel in the one-way clutch 610, for reaction drive from shaft 602 toward shaft 600 will concentrate in planet pinions 678 with a tendency to rotate sun gear 674 and integral secondary runner 636 at greater speed than shaft 602, with the result that the fluid couple between secondary runner 636 and primary runner 634, and in turn the fluid couple between primary runner 634 and impeller 626 and integral shaft 600, would preclude free-wheeling on the part of load shaft 602. Plate clutch unit 744 is further complemented by springs 766 compressed between presser plate 756 and the coincident side of ring gear 672, their tension thus tending to urge presser plate 756 to move in clutch disengaging direction. A series of cylinders 768 are formed in housing 748 and are preferably equally spaced (not shown) on a common circle line concentric with the axis of the drive shafting. A piston 770 is arranged in each of these cylinders and is adapted when sufficient fluid pressure is admitted between the respective cylinder head and the piston to force presser plate 756 in clutch engaging direction.

Means for fluid pressure to reach cylinders 768 can comprise drilled passages 772 and 774 and an annulus passage 776 all formed in hub portion 778 of clutch housing 748, and a conduit 780 drilled in bracket 782 secured to transmission housing 646 by bolts 784, the conduit 780 communicating with annulus passage 776 through a bearing 786 mounted in the bracket and within which is journaled hub portion 778 of clutch housing 748.

Brake band 788 is arranged so that when applied to clamp drum 698, it has one end anchored as indicated at 730 (Fig. 9) to housing 646, while the other end is connected to be actuated by piston 790 arranged (Fig. 5) in cylinder 792 when fluid pressure is admitted into the latter through conduit 794 formed in housing 646. Spring 796 is arranged to urge piston 790 to retract when the fluid pressure is allowed to escape through conduit 794, whereby brake 788 is normally released. This brake and actuating means therefor can be used, alternately to the clutch plates 764, for establishing the forward speed gear ratios in permanent two-way gear drive in which engine compression can be used effectively as a brake against vehicle momentum in reaction drive from the vehicle wheels to the engine. It will be seen that brake 788 may be applied whether or not the pawl 716 is in engaged position.

Fluid pressure for actuating either clutch pistons 770 or brake band piston 790 can be obtained from a pump 798 which can be normally disconnected from the drive and may be equipped with a centrifugal clutch mechanism (Fig. 15) having a driving clutch member 800 fixed to rotate with a first driving pump shaft 804 which is geared (Fig. 11) through gear members 810 and 812 to the output transmission shaft 602, and also having a driven clutch member (Fig. 15) 874 fixed to rotate with the shaft portion 866 of the driving gear 864 of the pump 798 (Figs. 11 and 15) adapted for connecting same to be driven from the driven shaft 602 when the latter attains a predetermined speed and which speed attainment may correspond with a predetermined M. P. H. attainment on the part of the vehicle at which automatic change from intermediate gear ratio to direct drive may be desired. It is contemplated that automatic centrifugal clutch control of the pump to induce fluid pressure at the instant ratio actutaion by that media is desired will eliminate the usually troublesome speed responsively governed valve devices to the same end such as would be required if fluid pressure for ratio actuation prevailed prior to the moment a respective ratio actuation by that media was desired. Such a pump can be provided with a discharge conduit 816 leading to a port 818 in valve housing 820 integral with bracket 782.

Housing 820 includes a discharge port 822 through which fluid pressure may flow for clutch actuation and to that end said port communicates with conduit 780. Housing 820 further includes a second discharge port 824 through which fluid pressure may flow for brake actuation and to that end port 824 is in communication with brake cylinder 792 through means of conduit 826 to conduit 794. Housing 820 further includes an outlet port 828 opening into the transmission case and through which fluid pressure is adapted to be expelled from the clutch cylinders 768 substantially simultaneous with the admission of fluid pressure to brake cylinder 792, or vice versa. Valve 830 is fitted for rotary movement only within housing 820 and has two diametrically opposite passages 832 and 834 in its periphery. In one position of valve 830, passage 832 is adapted to communicate with inlet port 818 and clutch communication port 822 while passage 834 communicates with brake communication port 824 and the free outlet port 828.

When output shaft 602 attains a predetermined speed resulting in engagement of clutch 800 and operation of pump 798, fluid pressure will immediately reach cylinders 768 and effect an engaged condition of clutch plates 764. By actuating valve 830 anticlockwise through approximately 90 degrees, from the position in which it is shown, passage 834 will connect clutch communication port 822 with free outlet port 828, thus providing an escape for the fluid pressure from clutch cylinders 768, and concurrently passage 832 will communicate the fluid pressure supply port 818 with brake communication port 824, thus providing for shifting at will between fluid pressure actuation for the high speed clutch and the two-way drive effective gear brake 788. Any suitable means may be provided to actuate lever 836 and thereby rotate valve 830.

In the superstructure of bracket 782 a second valve 838 is mounted for rotary movement only in a cylinder 842 and has a valve passage 844. Two ports 846 and 848 at approximately 90 degrees with each other are provided leading into cylinder 842, port 846 communicating with the fluid pressure annulus passage 776 and port 848 opening into the transmission case. In the position in which it is shown this valve is closed and fluid pressure in conduit 780 will reach cylinders 768 in force for clutch actuation. This valve is contemplated for use to optionally secure kick-down high speed (direct drive in this case) to sub-ratio gear drive, without molesting the selection of the fluid pressure actuating medium in communication with the high speed clutch. By rotating valve 838 clockwise through approximately 90 degrees, port 844 will register ports 846 and 848, thus establishing an escape passage for the free exit of the fluid pressure, whereby springs 766 would effect complete disengagement of clutch plates 764 and in effect return the drive to gear function adapted to secure reaction through the cooperating one-way coupling 704. Crank 850 is integral with valve 838 and any suitable means such as a Bowden wire 852 fixedly connected with crank 850 by means of set screw 854 can be provided by which valve 838 may be operated at will.

Returning to the pump 798 (Fig. 15) the construction of same includes a case 856 which can be secured (not shown) to the transmission case 646 and having a cover 858 attached thereto by bolts 860, together housing gears 862 and 864, the latter integral with clutch shaft 866 carrying annulus 868 fixed therewith by means of pin 870, with a driven clutch cone 872 fitted movable within annulus 868 and connected to rotate with the latter and the pump-clutch shaft 866 by means of a torque spring 874, the opposite ends of which are anchored, respectively, in a slot provision 876 therefor in driven clutch cone 872, and in a slot provision 878 therefor in annulus 868, thus clutch cone 872 will drive gear 864 and the latter gear 862. An intake conduit 880 communicates with pump 798 and is provided with strainer 882.

The clutch 800, whereby pump 798 is adapted to initiate and normally accomplish engagement of clutch plates 764, i. e., ratio change from sub-ratio gear drive to direct drive, when output shaft 602 attains a predetermined speed, can further include the driving clutch member 802 comprising a driving clutch cone 884 for engaging driven clutch cone 872, and having a hub portion 886 axially slidable on shaft 804 whereby integral driving clutch cone 884 is movable axially relative to shaft 804. Clutch 800 can further include annulus 802, which is fixed to shaft 804 by set screw 806. A spring loaded pawl 890 is selectively engageable in either of two annular grooves 892 and 894 formed in the periphery of hub 886.

Centrifugal weights 896 and 898 are hinged by pins 900, 902 and 904, the latter two pins being mounted in ears 906 (Fig. 15) integral, respectively, with driving clutch cone 884 and annulus 802 whereby increasing speed by the latter causes the weights 896 and 898 to exert increasing centrifugal force and concentrated at pins 900. Because of the toggle linkage arrangement, the force exerted by weights 896 and 898 tends to spread members 884 and 802 axially further apart with the result that since member 802 is fixed to shaft 804 by set screw 806, driving clutch cone 884 becomes actuated axially in clutch engaging direction. The range of pawl 890 selectively entering one of the grooves 892 and 894, together with the form of the pawl and groove, can be such that pawl 890 will restrain engaging clutch cone 884 from responding to weights 896 and 898 until the built up force in the latter is sufficient, once the pressure in pawl 890 is overcome, to cause the clutch cone to engage cone 872 with a force sufficient to compress spring 874 slightly whereby to permit pawl 890 to fully seat in groove 892.

This arrangement is such that when the speed of shaft 804 has dropped below a predetermined value, i. e., lower than the speed at which the pump clutch would be actuated into engagement, the force exerted by weights 896 and 898 will be insufficient to overcome the force of spring 874. This spring will then kick clutch cone 872 and cone 884 upwards so that land 908 between grooves 892 and 894 will pass under pawl 890. This pawl will wedge into groove 894 and raise cone member 884 out of engagement with cone member 872 whose upward movement is limited by engagement with shoulder 910 on bushing 912.

The bushing 912 and annulus 868 are fixed to clutch shaft 866 by pin 870. Thus it will be seen that pump 798 can be inoperative until output shaft 602 attains a predetermined speed. Then, if valve 832 is in the position shown, the operative pump can effect engagement of clutch plates 764 and a resultant ratio change from sub-ratio gear drive to direct drive. This automatic feature, in conjunction with the automatic overrunning of one-way coupling 704, and in conjunction with the automatic operation of the fluid coupling to change the gear ratio in the lower speeds, provides a fully automatic three forward speeds sequence.

By alternately operating valve 832 so as to connect pump 798 with brake cylinder 792 instead of clutch cylinders 768, the automatic sequences can be overruled, or interrupted, to establish a two-way drive second gear either momentarily or more or less permanently. Another variation in the fully automatic sequence can be effected by operating valve 838 to connect ports 846 and 848 and thereby release the fluid pressure in the clutch cylinders 768. Such valve actuation can be used either to prevent the otherwise normal full three speed sequence, culminating in third speed (direct drive), or to kick down direct drive to sub-ratio gear drive. The automatic three speed sequence and variations therein are all operative without interruption of torque for the drive.

In neutral, when pawl 716 occupies an intermediate position, in which it is shown, the drive mechanism will be in neutral and no drive will be transmitted to output shaft 602.

To select the mechanism for forward drive for full driving speed ratio sequence, pawl 716 is shifted outwardly from the intermediate position in which it is shown until teeth 714 are in full engagement with teeth 712, thus one-way reaction is established for ring gear 672. Thereafter input shaft 600 must be accelerated to initiate rotation of output shaft 602. Initially the drive will pass by way of the primary fluid couple from impeller 626 to primary runner 634, to shaft 606 and sun gear 662, to planet pinions 666, thence to carrier 670 at first speed ratio reduced speed, and therefrom through one-way clutch 610 to carrier 682 and integral shaft 602, planets 666 securing reaction for this first speed reduction ratio through ring gear 672 which is prevented from rotating backwards by one-way coupling 704 and basically by the engaged pawl 716 with the member 708 of one-way coupling 704.

*Fluid coupling transitional ratio change from first speed gear to second speed gear* starts when the torque in secondary runner 636 reaches a ratio relative to the torque load resistance in shaft 602 sufficient to initiate rotation of sun gear 674 at slightly higher speed than ring gear 684. This drives the rear epicyclic gear train of the forward speed pair in gear function and initiates overrunning of one-way clutch 610 of the forward epicyclic gear train. This produces a recombination in planet pinions 678 of the torque output of the forward gear train which reaches these pinions by way of ring gear 684, and the torque transmitted by the secondary fluid drive couple between runners 634 and 636 which reaches these pinions 678 through sun gear 674. This dual drive of shaft 602 increases its speed relative to input shaft 600 and the speed ratio between the input and output shaft may vary through an infinite number of values until the secondary runner 636 reaches the same speed as the primary runner 634. An important feature of the invention lies in the fact that this highly desirable, infinitely variable increase in the speed of the output or driven shaft 602 is accompanied by high efficiency operation of the fluid couplings.

During the transition between first speed and second speed gear ratios and in a full effect of the latter, the drive will be from shaft 600 through the primary fluid couple from impeller 626 to runner 634, thence in divided portions, respectively, the first portion of the input shaft torque from impeller 634 to shaft 600 to sun gear 662 to planet pinions 666 to carrier 670 and integral ring gear 684, to planet pinions 678, and in relatively parallel second power flow the second portion of the input shaft torque through the second fluid couple from runner 634 to runner 636 to shaft 664 to sun gear 674 and thence also to planet pinions 678, and from the latter the therein recombined torques driving carrier 682 and integral shaft 602. Reaction for the transition between first and second speed gear ratios and for the latter also is obtained by way of ring gear 672 being held by one-way coupling 704 and engagement of pawl 716 with member 708.

*Third speed* (direct drive) is established when shaft 602 and the associated pump driving shaft 604 attain a predetermined speed at which clutch 600 will engage and start pump 798 in operation. The resultant fluid pressure through conduit 816, valve 830, conduit 780 and passages 776, 774 and 772 reaches cylinders 768 and results in engagement of clutch plates 764. In direct drive the torque of input shaft 600 will be divided so that a first portion will pass through casing 612 and shaft portion 622 directly to clutch plates 764 thence through ring gear 672 to planet pinions 666, while the remaining portion of the input shaft torque will pass through the primary fluid couple from impeller 626 to runner 634 and therefrom can be transmitted in sub-divisions. One sub-division of the torque passes through shaft 600 and integral sun gear 662 to planet pinions 666 and therein recombines with the first portion of the torque. This recombined torque passes through carrier 670 and integral ring gear 684 to planet pinions 678. The second sub-division of the torque can pass from runner 634 through the second fluid couple to runner 636 thence through shaft 664 and integral sun gear 674 also to planet pinions 678 and therein recombines with the remainder of the torque before delivery to carrier 682 and integral shaft 602.

*Selective two-way drive gear speed* is attained by releasing clutch plates 674 and applying brake 788. In this selection the fluid turbines will operate as usual to select the drive in one of the first and second speed gear ratios, the two-way gear drive effect of brake band 788 acting directly on drum 698 and integral ring gear 672 will utilize the compounded efforts of the fluid couple effective between impeller 626 and runner 634 and the fluid couple effective between runners 634 and 636.

In reverse drive, clutch plates 764 are released, brake 788 is released and pawl 716 is engaged with teeth 720 of ring gear member 718, the forward epicyclic gear train will idle, while the drive will pass from shaft 600 through the fluid couple from impeller 626 to runner 634, thence through the secondary fluid couple from runner 634 to runner 636, thence through shaft 664 and integral sun gear 674 to planet pinions 678. The torque in carrier 682 and integral shaft 602 enables the planets 678 to drive ring gear 684 and integral sun gear 724 in reverse. The planet pinions 726 are being driven by sun gear 724 and track in held ring gear 718 to compound the reverse speed reduction and drive carrier 728 and integral shaft 602 in reverse. The torque in shaft 602 and integral carrier 682 being higher than the torque in ring gear 684 will secure the primary reverse speed result in planets 678 between sun gear 674 and ring gear 684. A feature of this combination is the fluid drive effected ratio change in the multiple speed gearing from a slow speed to a higher speed ratio with infinitely variable speed change performance characteristics, coupled with speed responsive means for sequentially and automatically increasing the speed ratio, and wherein, in all driving speeds of the sequence of forward speeds, the fluid drive coupling of the turbines is acting and which is adapted to create a ratio change in the multiple speed gearing in the lower speeds, and said fluid drive coupling can participate in the drive to an appreciable extent. An advantage of the arrangements in this embodiment of the invention (Fig. 11) of the pair of picyclic gear trains, the one-way couplings, reaction establishing means, multiple fluid drive coupling turbines, and clutch means parallel with the latter for the forward speeds is efficient driving use of the fluid drive-lever arm effect in the secondary runner 636, as well as that in the primary runner 634, both responsive to the same fluid circuit, while the primary portion of the power transmitted through the primary fluid coupling from impeller 626 to primary runner 634 and thence through shaft 600, sun 662, planets 666, carrier 670, and one-way clutch 610 to output shaft 602 is dominating the speed of the output shaft in accordance with the gear ratio singularly of the first epicyclic gear train.

Another advantage is continued efficient driving use of the fluid drive-lever arm effect in the primary runner 634, individually driving continued gear function in the first epicyclic gear train, in turn individually driving ring gear 684 of the second epicyclic gear train, while the torque dividing driving effect of the fluid discharge from primary runner 634 into secondary runner 636, and adapted as the parallel second power flow result through shaft 664 and integral 674 to planet pinions 678, is obtaining higher speed rotation of sun 674 than that of carrier 670 and integral ring gear 684, and is thus obtaining higher driving speed ratio output to shaft 602, as of the compound gear function of the pair of epicyclic gear trains, relative to the speed of impeller 626.

A further advantage resides in the provisions for continued efficient driving use of the full fluid drive-lever arm values of the primary and the secondary runners while their combined but respective effects individually rotating their associate sun gears, while an engaged condition of the clutch 744, dividing the input shaft torgue with the fluid coupling system as a whole, may individually rotate ring gear 672, and thereby adjust the compounded pair of epicyclic gear trains for direct drive coupling result therethrough.

Referring to Fig. 16, drive shaft 900 is the input member and can be connected with a suitable source of power, such as an engine (not shown). Driven shaft 902 is the output member and can be connected with a device to be driven, such as wheels of a motor vehicle (not shown). A first speed intermediate shaft 904 is arranged between and in alignment with the input shaft and the output shaft. A second speed intermediate shaft 906 is tubular in shape and is arranged concentrically with the first speed intermediate shaft. The compounded pair of epicyclic gear trains for multiple forward speeds comprise a first sun gear 908 fixed to shaft 904 by a key 910, planet pinions 912 in mesh with sun gear 908 and mounted to rotate on pins 914 supported by carrier 916, a first ring gear 918 in mesh with planet pinions 912 and integral with a second carrier 920 supporting pins 922 upon which planet pinions 924 are mounted to rotate, a second sun gear 926 in mesh with planet pinions 924 and integral with shaft 906, and ring gear 927 in mesh with planet pinions 924. Carrier 916 is integral with shaft 902.

One-way brake unit 928 is a typical one-way brake, or anchorage, between ring gear 918 and a stationary member 930 by which the first epicyclic gear train can resist movement in one direction and provide the first, or low forward speed, reduction ratio between sun gear 908 and carrier 916 forming part of shaft 902. The one-way brake is adapted to overrun to permit ring gear 918 to be driven in forward speed from the second epicyclic gear train for second speed.

A brake band 932 is adapted to clamp around a drum 934 integral with ring gear 927 to prevent the latter from rotating. This causes the second epicyclic gear train to function by providing a forward speed reduction between sun gear 926 and carrier 920 which is integral with ring gear 918.

The input shaft 900 is extended as a driving member in the form of a casing 936 which serves as a housing for the fluid turbines and terminates in a driving clutch member 938 of a clutch unit 940. The latter further includes a driven clutch member 942 integral with drum 934 and with ring gear 927. This clutch is diagrammatically shown and may be of any suitable type such, for example, as the clutches shown in the other embodiments of my invention. Any suitable actuating system adapted for alternately applying brake 932 and engaging clutch 940 can be provided as desired.

A first impeller 944 is integral with input shaft 900 for circulating a fluid of a first, or primary drive hydraulic circuit, having a first runner 946 disposed to receive the fluid discharged from impeller 944. The runner 946 is integral with shaft 904 and with a second impeller 948 of a second hydraulic circuit or turbine. The second turbine has a runner 950 disposed to receive the fluid discharged from the impeller 948 and is integral with shaft 906. By this combination and arrangement of the turbines a first, or primary, fluid drive couple between impeller 944 and runner 946 is effective to individually drive the first speed epicyclic gear train, and sequentially, when the primary runner 946 and integral second impeller 948 attain sufficient speed, a second, or secondary fluid drive couple between second impeller 948 and second runner 950 is effective to drive the second epicyclic gear train thus to establish second speed gear ratio.

The three forward speed sequence by this arrangement is obtained as follows:

*In first speed,* brake 928 is effective, brake 932 is applied, clutch 940 is disengaged, and the drive is from shaft 900 and integral impeller 944 through the first fluid couple to runner 946, to shaft 904, to sun gear 908, to planet gears 912 and to carrier 916 and integral shaft 902.

*Second speed* occurs when runner 950 receives a sufficient torque ratio from impeller 948 relative to the torque load resistance in ring gear 918 to drive the latter in forward speed. The resultant speed of ring gear 918 added to that of sun gear 908 increases the driving speed ratio and the speed of shaft 902. When runner 950 attains the speed of impeller 948 so that sun gears 908 and 926 rotate at the same speed, second speed will attain full ratio value. Accordingly, second speed drive will be through parallel torque-multiplying paths. The first portion of the torque of input shaft 900 which is transmitted by fluid couple from impeller 944 to runner 946, will be delivered through shaft 904 and integral sun gear 908 to planet gears 912. The remaining portion of the input torque which is transmitted from shaft 900 to runner 946, will be delivered from the latter through the second fluid couple to runner 950, to shaft 906 and integral sun gear 926, to planet gears 924, and therefrom through carrier 920 and integral ring gear 918 to planet pinions 912. These pinions serve to recombine the divided torque before delivery to carrier 916 and integral shaft 902. Brake 932 provides reaction for second speed.

*Third speed* (direct drive) is obtained supplantively over second speed by releasing brake 932 and engaging clutch 940. The torque of shaft 900 is thereupon primarily divided between runner 946 and ring gear 927 and the portion transmitted by the first fluid couple to runner 946 will be sub-divided by the second fluid couple between sun gears 926 and 908. The three divisions of the torque will be recombined in the compounded pair of epicyclic gear trains before delivery to carrier 916 and integral shaft 902 as direct drive.

A principal advantage and an important feature of this arrangement is the dependency upon the primary runner 946 attaining sufficient speed for the second impeller integral therewith to attain an appreciable drive transmitting effectiveness, as of a second hydraulic circuit, to initiate rotation of sun gear 926. Another advantage is a full hydraulic circuit, i. e., the full lever arm value of a respective hydraulic circuit, adapted to drive each of the relatively rotatable primary driving gear members of the compounded epicyclic gear trains.

Referring now to Fig. 17, the gearing and brake and clutch combinations and arrangement are identical to those disclosed in Fig. 16. The only differences between the two embodiments of the invention lie wholly within the turbines. In Fig. 17 the second impeller 948' is attached to and rotates with the input shaft 900' so that both hydraulic circuits are adapted to be individually and directly driven by the input shaft. A valve 952 is arranged for axial movement into and out of a position in which it will inhibit circulation of the fluid in the second speed hydraulic circuit. A spring 954 urges the valve normally to occupy the inhibiting or closed position. The valve is moved to open position by the creation of fluid pressure in a cylinder 956 having a piston 958 which overcomes the influence of the spring to move valve 952 out of the inhibiting position.

Fluid is admitted to cylinder 956 through a port 960 which may be connected with a pump like that shown in Fig. 11 and controlled by valve means of the kind shown in that figure. Any other suitable form and arrangement of pump for supplying fluid pressure to the valve actuating cylinder, and any other suitable arrangement of passages to connect such a pump with the cylinder port 960, as well as any other suitable control over the fluid pressure, can be provided as desired.

While the changes in speed ratios are effected in the same way in the embodiments of Figs. 16 and 17, the latter embodiment is more flexible and has a wider application. In Fig. 16 the ratio changes are controlled by the speed of the input shaft, whereas in Fig. 17 the ratio changes are also under the control of the valve 952. This valve may be shifted by any desired external control of either the manual or automatic type or any combination thereof.

Although the invention has been described in connection with several embodiments, the principles involved are susceptible of numerous other applications which will readily occur to persons skilled in the art. The invention is therefore to be limited only as indicated by the scope of the appended claims.

1. In drive transmitting arrangements for motor vehicles, an engine shaft, a load shaft, a variable speed transmission mechanism adapted to transmit a multiplicity of ratios between said shafts, actuating means for said mechanism adapted to establish a sequence of reduction speed ratios and direct drive therein, and control means for said actuating means constructed and arranged to select a sequence of three reduction ratios and direct drive by said mechanism, said mechanism further including a fluid turbine coupling adapted automatically to establish the second speed reduction ratio sequentially to the first speed reduction ratio, and said mechanism being also adapted sequentially to provide a third speed reduction ratio and a direct drive, said multiple ratio transmission mechanism including parallel drive transmitting trains and different rate torque multiplying means adapted to divide and recombine torque between said shafts in each of second and third speed reduction ratios and in direct drive whereby scalar ratio portions of the engine torque will drive said sequentially different rate torque multiplying means and sequentially direct drive, each in circumvention of said fluid turbine coupling so that only scalar ratio portions of the engine torque will be delivered to and for delivery through said fluid turbine coupling.

2. In a power transmission, an input shaft, an output shaft, two relatively rotatable elements coupled for delivering recombined torque selectively in torque-multiplying, speed-reducing ratio, or in direct drive, to said output shaft, and a fluid coupling including an impeller rotatable with said input shaft for circulating a fluid in said fluid coupling, said fluid coupling further including relatively rotatable primary and secondary runners adapted to be driven by the circulated fluid, said secondary runner being so disposed as to receive the fluid discharged from said primary runner and to discharge the fluid for return to said impeller, said primary runner being connected to rotate with one of said two elements, said secondary runner being connected to rotate with the other of said two elements, alternately operable brake and clutch means cooperable with and selectively controlling the torque coupling between said two relatively rotatable elements jointly and said output shaft either to provide torque multiplication and recombination or direct drive, and one-way coupling means cooperable with said torque coupling between said two relatively rotatable elements and said output shaft.

3. In a power transmission, an input shaft, an output shaft, a compounded plurality of epicyclic gear trains including three relatively rotatable elements forming multiple speed ratio drive transmitting means selectively effective, in torque multiplying gear function, to couple two of said relatively rotatable elements for delivering recombined torque to said output shaft, or in direct drive couple, to couple all three of said relatively rotatable elements for delivering recombined torque to said output shaft, a fluid coupling including an impeller connected to rotate with said input shaft for circulating a fluid in said fluid coupling, said fluid coupling further including relatively rotatable primary and secondary runners adapted to be driven by the circulated fluid, said secondary runner being so disposed as to receive the fluid discharged from said primary runner and to discharge the fluid to said impeller, said primary runner being connected to rotate with one of said two elements of the three named relatively rotatable elements, said secondary runner being connected to rotate with the other of said two elements of said named three relatively rotatable elements, and a clutch unit, the driving clutch element of which is connected to rotate with said input shaft and the driven clutch element of which is connected to rotate with the third of said three relatively rotatable elements.

4. In apparatus of the class described, the combination of a rotatable power input member, a first shaft permanently connected to rotate with said member, a fluid turbine driving element driven by said member, a second shaft, a third shaft, a first fluid turbine runner connected to said third shaft, a second fluid turbine runner connected to said second shaft, three relatively rotatable sun pinion gears each individually driven by a separate one of said shafts, planetary pinions meshing with each of said sun gears, a ring gear meshing with the pinions engaging the sun gear of the first shaft, a brake for holding said ring gear against rotation, a clutch for locking said ring gear to its sun gear, a second ring gear for the pinions engaging the sun gear driven by the second shaft, a planet carrier for the pinions engaging said first named ring gear, a connection between said carrier and said second ring gear, a brake for said second ring gear, a third ring gear, a carrier for the pinions engaging said second ring gear, said last named carrier being connected to said third ring gear, a carrier for pinions engaging said third ring gear, a load shaft driven by said carrier, and means for controlling rotation of said third ring gear.

5. In apparatus of the class described, the combination of a rotatable power input member, a first shaft individually directly coupled to said member, a fluid turbine element driven by said member, a second shaft, a one way clutch interposed between said shafts, a third shaft, a first fluid turbine runner connected to said third shaft, a second fluid turbine runner connected to said second shaft, a sun gear driven by each of said shafts, planetary pinions meshing with each of said sun gears, a ring gear meshing with the pinions engaging the sun gear of the first shaft, a brake for holding said ring gear against rotation, a clutch for locking said ring gear to rotate with its sun gear, a second ring gear for the pinions engaging the sun gear driven by the second shaft, a planet carrier for the pinions engaging said first named ring gear, a connection between said carrier and said second ring gear, a brake for said second ring gear, a third ring gear, a carrier for the pinions engaging said second ring gear, said last named carrier being connected to said third ring gear, a carrier for pinions engaging said third ring gear, a load shaft connected to rotate with said carrier, a fourth sun gear driven by said third ring gear, a fourth set of pinions engaging said fourth sun gear, a carrier for said fourth set of pinions, said carrier being rotatable with said load shaft, a fourth ring gear for said fourth set of pinions, means for selectively locking said fourth ring gear against rotation, a brake drum, a brake engageable with said drum, a one-way clutch for connecting reactance between said brake drum and said third ring gear and fourth sun gear, and control means for said clutch and brakes.

6. In apparatus of the class described, the combination of a rotatable power input member, a clutch element driven thereby, a second clutch element adapted to be driven from said first clutch element when said clutch is engaged, a first ring gear driven by said second clutch element, a first set of planetary pinions engaging said ring gear, a first carrier for said pinions, a second sun gear driven by said carrier, means for selectively locking said first ring gear against rotation, a second set of pinions engaging said second sun gear, a second carrier for said second set of pinions, a load shaft connected to said second carrier, a second ring gear for said second set of pinions, means for selectively locking said second ring gear against rotation, said two locking means being alternately engageable and operated from the same control, a first sun gear engaging said first set of pinions, a first shaft connected to said first sun gear, a first turbine runner connected to said first shaft, a turbine driving element connected to said rotatable input member, a second turbine runner connected to a second shaft, a third sun gear driven by said second shaft, a third set of pinions meshing with said third sun gear, a third carrier for said third set of pinions, a one way clutch between said third carrier and said first carrier, a driving connection between said third carrier and said load shaft, a third ring gear for said third set of pinions attached to said first carrier and second sun gear, a frictionally-engaging brake for selectively engaging said first ring gear, fluid pressure means for operating said clutch and brake, a speed responsive pump for supplying fluid under pressure to said last named means, and separate control valves for said clutch and brake.

7. In apparatus of the class described, the combination of a rotatable power input member, a clutch element driven thereby, a second clutch element adapted to be driven from said first clutch element when said clutch is engaged, a first ring gear driven by said second clutch element, a first set of planetary pinions engaging said ring gear, a first carrier for said pinions, a second sun gear driven by said carrier, means for selectively locking said first ring gear against rotation, a second set of pinions engaging said second sun gear, a second carrier for said second set of pinions, a load shaft connected to said second carrier, a second ring gear for said second set of pinions, means for selectively locking said second ring gear against rotation, said two locking means being alternately engageable and operated from the same control, a first sun gear engaging said first set of pinions, a first shaft connected to said first sun gear, a first turbine runner connected to said first shaft, a turbine driving element connected to said rotatable input member, a second turbine runner connected to a second shaft, a third sun gear driven by said second shaft, a third set of pinions meshing with said third sun gear, a third carrier for said third set of pinions, a one way clutch between said third carrier and said first carrier, a driving connection between said third carrier and said load shaft, a third ring gear for said third set of pinions attached to said first carrier and second sun gear, a brake for selectively engaging said first ring gear, and means for operating said clutch and brake.

8. In apparatus of the class described, the combination of a rotatable power input member, a clutch element driven thereby, a second clutch element adapted to be driven from said first clutch element when said clutch is engaged, a first ring gear driven by said second clutch element, a first set of planetary pinions engaging said ring gear, a first carrier for said pinions, a load shaft, a first sun gear engaging said first set of pinions, a first shaft connected to said first sun gear, a first turbine runner connected to said first shaft, a turbine driving element connected to said rotatable input member, a second turbine runner connected to a second shaft, a second sun gear driven by said second shaft, a second set of pinions meshing with said second sun gear, a second carrier for said second set of pinions, a driving connection between said second carrier and said load shaft, means including a one way clutch effective directly to transmit torque and the speed of said first carrier to said second carrier and load shaft and permitting said load shaft and second carrier to overrun said first carrier under any tendency of said load shaft and second carrier to rotate faster in a forward drive direction than said first carrier, a second ring gear for said second set of pinions attached to said first carrier, a brake for selectively engaging said first ring gear, and means for operating said clutch and brake.

9. In apparatus of the class described, the combination of a rotating power input member, a fluid turbine element driven by said member, a fluid turbine runner driven by fluid circulated by said element, a shaft connected to said runner, a sun gear driven by said shaft, planetary pinions engaging said sun gear, a carrier for said pinions, a load shaft driven by said carrier, a second fluid turbine having an element driven by said runner, a runner for said second fluid turbine, a third shaft driven by said runner, a second sun gear driven by said third shaft, a second set of pinions engaging said second sun gear, a carrier for said second set of pinions, a ring gear connected to said carrier and engaging said first set of pinions, means for selectively locking said ring gear against rotation, a second ring gear for said second set of pinions, a brake for selectively holding said second ring gear against rotation, and means for selectively establishing drive individually between said input member and said second ring gear whereby primarily to divide input torque with said fluid turbine coupling system as a whole.

10. In apparatus of the class described, the combination of a rotatable power input member, a fluid turbine element driven thereby, a fluid turbine runner driven by fluid circulated by said element, a first shaft driven by said runner, a first sun gear attached to said shaft, a first set of planetary pinions engaging said sun gear, a carrier for said pinions, a second fluid turbine having an element driven by said input member, a second runner in said second turbine, a second shaft driven by said second runner, a second sun gear driven by said second shaft, a second set of planetary pinions engaging said second sun gear, a planetary carrier for said second set of planetary pinions, a first ring gear connected to said last named carrier and engaging said first set of pinions, means for selectively holding said ring gear against rotation, a second ring gear for said second set of pinions, a brake for selectively holding said second ring gear against rotation, a clutch for selectively connecting said second ring gear with said input member, a valve for controlling fluid circulation in said second turbine, means for operating said valve, and a load shaft driven by said first named carrier.

11. In apparatus of the class described, the combination of a rotatable power input member, a fluid turbine element driven thereby, a fluid turbine runner driven by fluid circulated by said element, a first shaft driven by said runner, a first sun gear attached to said shaft, a first set of planetary pinions engaging said sun gear, a carrier for said pinions, a second fluid turbine having an element driven by said input member, a second runner in said second turbine, a second shaft driven by said second runner, a second sun gear driven by said second shaft, a second set of planetary pinions engaging said second sun gear, a planetary carrier for said second set of planetary pinions, a first ring gear connected to said last named carrier and engaging said first set of pinions, means for selectively holding said ring gear against rotation, a second ring gear for said second set of pinions, a clutch for selectively connecting said second ring gear with said input member, means for selectively establishing or disestablishing the drive individually between said input member and said second shaft and second sun gear via said second fluid turbine, means for operating said valve, and a load shaft driven by said first named carrier.

12. In apparatus of the class described, the combination of a rotatable power input member, a fluid turbine element driven thereby, a fluid turbine runner driven by fluid circulated by said element, a first shaft driven by said runner, a first epicyclic gear train connected to said shaft, a second fluid turbine having an element driven by said input member, a second runner in said second turbine, a second shaft driven by said second runner, a second epicyclic gear train connected to said second shaft, means interconnecting said gear trains, means for selectively holding a part of said first gear train against rotation, a brake for selectively holding a part of said second gear train against rotation, a clutch for selectively connecting said second gear train with said input member, a valve for controlling fluid circulation in said second turbine, means for operating said valve, and a load shaft driven by said gear trains.

13. In apparatus of the class described, the combination of a rotating power input member, a first ring gear driven thereby, a first set of planetary pinions engaging said ring gear, a first carrier for said pinions, a first shaft attached to said carrier, a fluid turbine element driven by said shaft, a first sun gear for said pinions, a clutch for selectively locking said sun gear to said carrier, a brake for selectively holding said sun gear against rotation, a turbine runner, a second shaft driven by said runner, a second sun gear driven by said shaft, a second set of pinions engaging said sun gear, a second carrier for said second set of pinions, a second ring gear for said second set of pinions, a clutch for selectively connecting said second ring gear to said first named shaft, a second brake for selectively holding said second ring gear against rotation, a second turbine runner, a third shaft driven by said second runner, a third sun gear driven by said third shaft, a third set of pinions engaging said third sun gear, a third ring gear engaging said third set of pinions and attached to said second carrier, a third carrier for said third set of pinions, a load shaft driven by said third carrier, a fourth sun gear connected to said second ring gear, a fourth set of pinions engaging said fourth sun gear, a fourth carrier for said fourth set of pinions, said fourth carrier being attached to said load shaft for rotation therewith, a fourth ring gear engaging said fourth set of pinions, means for selectively locking said fourth ring gear, fluid operated means for said clutches and brakes, and controls for said fluid operated means.

14. In apparatus of the class described, the combination of a rotating power input member, a first gear train driven thereby, a first shaft attached to said gear train, a fluid turbine element driven by said shaft, a brake for selectively holding a part of said gear train against rotation, a turbine runner, a second shaft driven by said runner, a second gear train driven by said shaft, a second brake for selectively holding a part of said second gear train against rotation, a second turbine runner, a third shaft driven by said second runner, a third gear train driven by said third shaft, means connecting said second and third gear trains, a load shaft driven by said third gear train, and means for holding a part of said third gear train against rotation.

15. In drive mechanism, a pair of relatively rotatable sun gears, two relatively rotatable carriers each supporting pins upon which planet pinions are mounted to rotate, one of the sun gears being in mesh with the planet pinions mounted on one of the carriers, the other of the sun gears being in mesh with the planet pinions mounted on the other carrier, a ring gear in mesh with the planet pinions mounted on one of the carriers, a second ring gear in mesh with the planet pinions mounted on the other carrier, one of the ring gears being connected to rotate with the carrier upon which the planet pinions meshing with the other ring gear are mounted, a drum rotatable independently of either of the ring gears, a brake band anchored against rotation and applicable to and releasable from clamping engagement with the drum, and a one way clutch connecting the last mentioned ring gear with the drum.

16. In a drive mechanism having a plurality of three epicyclic gear trains each comprising an independently rotatable sun gear, a ring gear, an individual carrier supporting pins upon which planet pinions are mounted to rotate, the planet pinions of each of the carriers being in mesh with the sun gear and the ring gear of its epicyclic train, the carrier of the first epicyclic train being connected for rotation with the ring gear of the intermediately positioned second epicyclic train and the carrier of the intermediately positioned second train being connected for rotation with the ring gear of the third epicyclic train; combined with a separate drum associated in reaction with each of the three ring gears; a separate brake band for engaging each of the drums; a separate actuating means cooperable with each of the brake bands, each actuating means adapted to be fluid pressure actuated at least in one direction; and an individual clutch unit associated with certain elements of the first epicyclic gear train for connecting the elements of that epicyclic gear train for unitary rotation when all of the brake bands are released.

17. In apparatus of the class described, the sub-combination of three relatively rotatable concentric shafts each having an individual sun gear rotatable therewith, a first ring gear, a first carrier supporting pins upon which a first series of planet pinions are mounted to rotate, each pinion being meshed with both the sun gear of the outer one of said shafts and said first ring gear, a second ring gear, a second carrier supporting pins upon which a second series of planet pinions are mounted to rotate, each last mentioned pinion being meshed with both the sun gear of the intermediately disposed one of said shafts and said second ring gear, a third ring gear, a third carrier supporting pins upon which a third series of planet pinions are mounted to rotate, each pinion of said third series being meshed with both the sun gear of the inner one of said shafts and said third ring gear, said first carrier and said second ring gear being connected to rotate in unison, said second carrier and said third ring gear being connected to rotate in unison, individual reaction means cooperating with each of said ring gears and being releasable to permit rotation of any of said ring gears, and a clutch adapted for selectively connecting the elements of the first epicyclic gear unit the driving sun gear of which is rotatable with the outer one of said three shafts for unitary rotation with said shaft.

18. A drive mechanism including a driving shaft and an output shaft, a first multi-speed gearing group driven directly by the input shaft and a second multi-speed gearing group driving the output shaft, the second multi-speed gearing group comprising a plurality of epicyclic gear trains each having an individual primary driving gear element adapted to receive input power to effect torque multiplication of its respective epicyclic gear train, the primary driving gear element of each of the epicyclic gear trains being relatively rotatable with respect to the corresponding gear element of each of the other epicyclic gear trains of said second multi-speed gearing and coupled for recombination of the torques of the primary driving gear elements of the epicyclic trains being driven before delivery to said output shaft, multiple drive coupling means driven by the first multispeed gearing group and including an individual clutch unit adapted to drive each of the relatively rotatable primary driving gear elements of the second multi-speed gearing group, said multiple drive coupling means further including an additional clutch unit adapted to drive still another gear element of the second multispeed gearing group for connecting the elements of the latter for substantially unitary rotation whereby the different driving speed values of the first multi-speed gearing group can be compounded selectively by either of at least three different speed ratios in the second multi-speed gearing group and effective in at least the highest driving speed ratio reduction speed, lowest rate torque multiplying drive and in direct drive in said second multispeed gearing group to divide and recombine divided torque between output from said first multi-speed gearing group and said output shaft.

19. In a drive mechanism of the class described, a first epicyclic gearing including an output planet carrier therewith, a second epicyclic gearing group including an individual output planet carrier therewith, one of the sun and ring gears of said first gearing group being connected to rotate with one of the sun and ring gears of said second gearing group, the gear elements of said first and second gearing groups being normally rotatable relative to each other but whereby in compounded gear drive relation the output from said first gearing group will reach the planet carrier of said second gearing group through partial gear function in the latter, and a one way clutch the driving clutch element of which is rotatable with the ouput planet carrier of said first gearing group and the driven clutch element of which is rotatable with the output planet carrier of said second gearing group whereby the output from said first gearing group is adapted to drive directly through the position occupied by and independently of the gearing assembly of said second gearing group while the latter's independently rotatable driving gear element is insufficiently energized to set said second gearing group in gear function and assume the load on its output planet carrier.

20. In a transmission, the combination of a power input member, a power output member, a step ratio change speed first gearing group driven directly by said power input member, alternately operable reaction brake and clutch means for establishing the different speed ratios of said first gearing group, fluid turbine coupling means connected solely to take torque delivered by any ratio of said first gearing group from said power input member, said fluid coupling means connected for dividing torque into parallel torque paths, a second gearing group constituting a change driving speed ratio reduction speed and rate multiplying torque gear set connected to drive said output shaft and connected to recombine the torque divided by said fluid coupling means in the drive therein adapted to yield the lower rate torque multiplication before delivery to said power output member, said second gearing group adapted to yield high rate multiplication of the torque delivered through one of said parallel paths from said fluid coupling means, said second gearing group further adapted to yield relatively lower rate multiplication of the torque delivered through a plurality of said parallel paths from said fluid coupling means, and means including a unit of frictionally-engaging elements for establishing a torque path between said first gearing group and an individual driving gear element of said second gearing group independently of and primarily to divide torque with said fluid coupling means to establish a still faster driving speed ratio through said second gearing group between said first gearing group and said power output member and in dependency upon said fluid coupling means continuing to divide torque between said first-named parallel paths and for recombining of the thus multiplied torque portions in said second gearing group before delivery to said power output member.

21. In a variable speed transmission mechanism, in subcombination, a planetary gear unit comprising a driving gear, a set of planetary pinions meshing with said driving gear, a reaction gear meshing with said planetary pinions and a carrier adapted for connection with the propelling system for a load, a free drum, a unit of frictionally-engaging brake mechanism for holding or releasing said drum, and a one-way coupling means connecting said reaction gear and drum whereby while said frictionally-engaging brake mechanism is applied for holding said drum said reaction gear will be restrained from rotating retrograde relative to forward speed drive direction of rotation by said driving gear, and at the same time whereby said reaction gear will be free to rotate in said forward speed drive direction, a second drum secured to rotate with said reaction gear, a second unit of frictionally-engageable broke mechanism adapted optionally to be actuated into engagement with said second drum to hold said drum and reaction gear against rotating in either direction whereby the same reduction speed gear unit may be selectively established in either a one-way reaction sustaining connection permitting overrun of its reaction gear in forward drive direction or a two-way reaction sustaining connection to render the same gear unit permanently a power drive and inversely a load reaction transmitting drive torque converter unit and establishable either in one-way drive, two-way drive or in neutral under constantly drivingly applying torque conditions.

22. In apparatus of the class described, the combination of a rotating power input member, a fluid turbine element driven by said member, a fluid turbine runner driven by fluid circulated by said element, a second fluid turbine having an element driven by said runner, a runner for said second fluid turbine, a load shaft, a mechanical variable-ratio torque converter connected to provide a differential gear drive between said runners and load shaft adapted to yield high torque multiplication between said first named runner and load shaft and adapted to yield lower torque multiplication and to recombine the torque of both said runners for driving said load shaft, and a clutch for establishing a torque path between said power input member and an element of said converter independently of said turbines for establishing a still faster driving speed ratio between said power input member and load shaft but dependent upon said turbines to transmit a portion of said input torque.

23. In apparatus of the class described, the combination of a rotatable power input member, a power output member, a variable speed ratio gearing connected to drive said output member, said gearing having at least three relatively rotatable driving gear elements coupled to deliver recombined torque to said output member, said coupling between the first of said three gear elements and said output member adapted to yield a low speed ratio therebetween, said coupling between said first gear element and the second of said three gear elements jointly and said output member adapted to yield a second speed ratio therebetween, said coupling between said three gear elements and said output member adapted to yield a still higher speed ratio therebetween, a first fluid coupling driven by said power input member and connected to drive said first gear element, a second fluid coupling driven by said power input member and connected to drive said second gear element, means for rendering said second fluid coupling operative after said output member is put in motion through said first fluid coupling via said low speed ratio, and a clutch for completing driving connections between said power input member and said third gear element independently of said fluid couplings.

24. In drive mechanism, a pair of relatively rotatable sun gears, fluid actuated means for driving said sun gears, two relatively rotatable carriers each supporting pins upon which planet pinions are mounted to rotate, one of the sun gears being in mesh with the planet pinions mounted on one of the carriers, the other of the sun gears being in mesh with the planet pinions mounted on the other carrier, a ring gear in mesh with the planet pinions mounted on one of the carriers, a second ring gear in mesh with the planet pinions mounted on the other carrier, one of the ring gears being connected to rotate with the carrier upon which the planet pinions meshing with the other ring gear are mounted, a drum rotatable independently of either of the ring gears, a brake band anchored against rotation and applicable to and releasable from clamping engagement with the drum, and a one way clutch connecting the last mentioned ring gear with the drum.

25. In a drive mechanism having a compounded plurality of three epicyclic gear trains each comprising an independently rotatable sun gear, a ring gear, an individual carrier supporting pins upon which planet pinions are mounted to rotate, the planet pinions of each of the carriers being in mesh with the sun gear and the ring gear of its epicyclic train, the carrier of the first epicyclic train being connected for rotation with the ring gear of the intermediately positioned second epicyclic train and the carrier of the intermediately positioned second train being connected for rotation with the ring gear of the third epicyclic train; combined with a separate drum associated in reaction with each of the three ring gears; a separate brake band for engaging each of the drums; a separate actuating means cooperable with each of the brake bands, each actuating means adapted to be fluid pressure actuated at least in one direction; an individual clutch unit associated with certain elements of the first epicyclic gear trains for connecting the elements of that epicyclic gear train for unitary rotation when all of the brake bands are released; and fluid actuated means for driving the sun gears of the second and third epicyclic gear trains.

26. In a power transmitting system the combination including a power input member, a fluid turbine coupling including an impeller turbine member directly driven by said input member, said turbine coupling further including two other relatively rotatable members arranged to engage the single operating fluid circuit of the fluid circulated by said impeller, a plurality of three compounded internal gear type epicyclic gear sets coupled for a speed reducing ratio of said first gear set to drive the internal gear of said second of said gear sets, and for a speed reducing ratio of said second gear set to drive the internal gear of said third gear set, each of said three gear sets having an independently rotatable primary input sun pinion gear, one of said two other relatively rotatable members aforesaid arranged to engage the operating fluid circuit of the fluid circulated by said impeller turbine member being connected to rotate with the sun gear of one of said second and third gear sets, the other of said two other relatively rotatable members aforesaid arranged to engage the operating fluid circuit of the fluid circulated by said impeller turbine member being directly connected to an individual independently rotatable member of the coupled said plurality of gear sets, and means for establishing torque transmission from said input power member through said sun gear of and said first gear set to obtain reduction speed, torque multiplication therein effective primarily to divide said input power member torque with the fluid turbine coupling.

EVERETT R. BURTNETT.

(References on following page)

REFERENCES CITED

The following references are of record in the file of this patent:

UNITED STATES PATENTS

| Number | Name | Date |
|---|---|---|
| 918,574 | Mayo | Apr. 20, 1909 |
| 2,129,886 | Syrony | Sept. 13, 1938 |
| 2,135,246 | Yoxall | Nov. 1, 1938 |
| 2,156,041 | Duffield | Apr. 25, 1939 |
| 2,159,427 | Dunn | May 23, 1939 |
| 2,203,177 | Patterson | June 4, 1940 |
| 2,211,233 | Kelley | Aug. 13, 1940 |
| 2,232,797 | Neracher | Feb. 25, 1941 |
| 2,280,015 | Tipton | Apr. 14, 1942 |
| 2,291,120 | Tipton | July 28, 1942 |
| 2,306,834 | Tipton | Dec. 29, 1942 |
| 2,316,390 | Biermann | Apr. 13, 1943 |
| 2,317,498 | Tipton | Apr. 27, 1943 |
| 2,318,660 | Barrett | May 11, 1943 |
| 2,319,706 | Reit | May 18, 1943 |
| 2,324,713 | McFarland | July 20, 1943 |
| 2,368,873 | Pollard | Feb. 26, 1945 |

Certificate of Correction

August 15, 1950

Patent No. 2,519,022

EVERETT R. BURTNETT

It is hereby certified that error appears in the printed specification of the above numbered patent requiring correction as follows:

Column 43, line 5, for the word "broke" read *brake*; column 44, line 34, for "trains" read *train*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*